(12) United States Patent
Pulliam et al.

(10) Patent No.: US 10,759,240 B2
(45) Date of Patent: Sep. 1, 2020

(54) BALL HITCH FIFTH WHEEL

(71) Applicant: Pullium Enterprises, Inc., Mishawaka, IN (US)

(72) Inventors: Randall A. Pulliam, Mishawaka, IN (US); James M. Karasch, Elkhart, IN (US)

(73) Assignee: Pulliam Enterprises, Inc., Mishawaka, IN (US)

( * ) Notice: Subject to any disclaimer, the term of this patent is extended or adjusted under 35 U.S.C. 154(b) by 0 days.

(21) Appl. No.: 16/692,116

(22) Filed: Nov. 22, 2019

(65) Prior Publication Data

US 2020/0086701 A1 Mar. 19, 2020

Related U.S. Application Data

(63) Continuation-in-part of application No. 16/058,456, filed on Aug. 8, 2018, now Pat. No. 10,486,479, which is a continuation-in-part of application No. 15/205,508, filed on Jul. 8, 2016, now Pat. No. 10,065,467.

(60) Provisional application No. 62/190,040, filed on Jul. 8, 2015.

(51) Int. Cl.
*B60D 1/01* (2006.01)
*B60D 1/167* (2006.01)
*B60D 1/06* (2006.01)
*B60D 1/02* (2006.01)
*B60D 1/07* (2006.01)

(52) U.S. Cl.
CPC ............. *B60D 1/015* (2013.01); *B60D 1/06* (2013.01); *B60D 1/1675* (2013.01); *B60D 1/02* (2013.01); *B60D 1/07* (2013.01)

(58) Field of Classification Search
CPC .. B60D 1/015; B60D 6601/06; B60D 1/1675; B60D 1/07; B60D 1/02
See application file for complete search history.

(56) References Cited

U.S. PATENT DOCUMENTS

| 6,186,530 | B1 * | 2/2001 | Zilm | ................ | B62D 53/0828 280/423.1 |
| 7,490,846 | B2 * | 2/2009 | Kaun | ................ | B62D 53/0814 280/441 |
| 7,878,525 | B2 * | 2/2011 | Andersen | ............... | B60D 1/065 280/416.1 |

(Continued)

*Primary Examiner* — Kevin Hurley
*Assistant Examiner* — Marlon A Arce
(74) *Attorney, Agent, or Firm* — Botkin & Hall, LLP

(57) ABSTRACT

A fifth wheel hitch is adapted to affix to a vehicle having a vehicle-mounted ball that protrudes from a towing vehicle surface. The hitch has a frame with a sleeve portion that is fixed, and a rocker assembly is telescopingly received inside the sleeve portion. The rocker assembly is selectively affixed to the frame with a pin that extends through the receiver and sleeve portion. A ball cage affixes to the vehicle-mounted ball using pins that extend through vertical walls in the cage. The ball cage can be received by the frame in a close orientation that locates the vehicle-mounted ball closer to the rocker assembly and a far orientation that locates the ball farther away. The cage includes a threaded fastener that extends outwardly. The frame has an elongate aperture that receives the threaded fastener to secure the ball cage with a nut into a cage pocket.

20 Claims, 38 Drawing Sheets

(56) References Cited

U.S. PATENT DOCUMENTS

| | | | |
|---|---|---|---|
| 8,366,134 B1* | 2/2013 | Choquette | B62D 53/0814 |
| | | | 280/441.1 |
| 9,592,863 B2* | 3/2017 | McCoy | B62D 53/08 |
| 2016/0107492 A1* | 4/2016 | McCoy | B60D 1/46 |
| | | | 280/438.1 |
| 2017/0217268 A1* | 8/2017 | Andersen | B60D 1/06 |

* cited by examiner

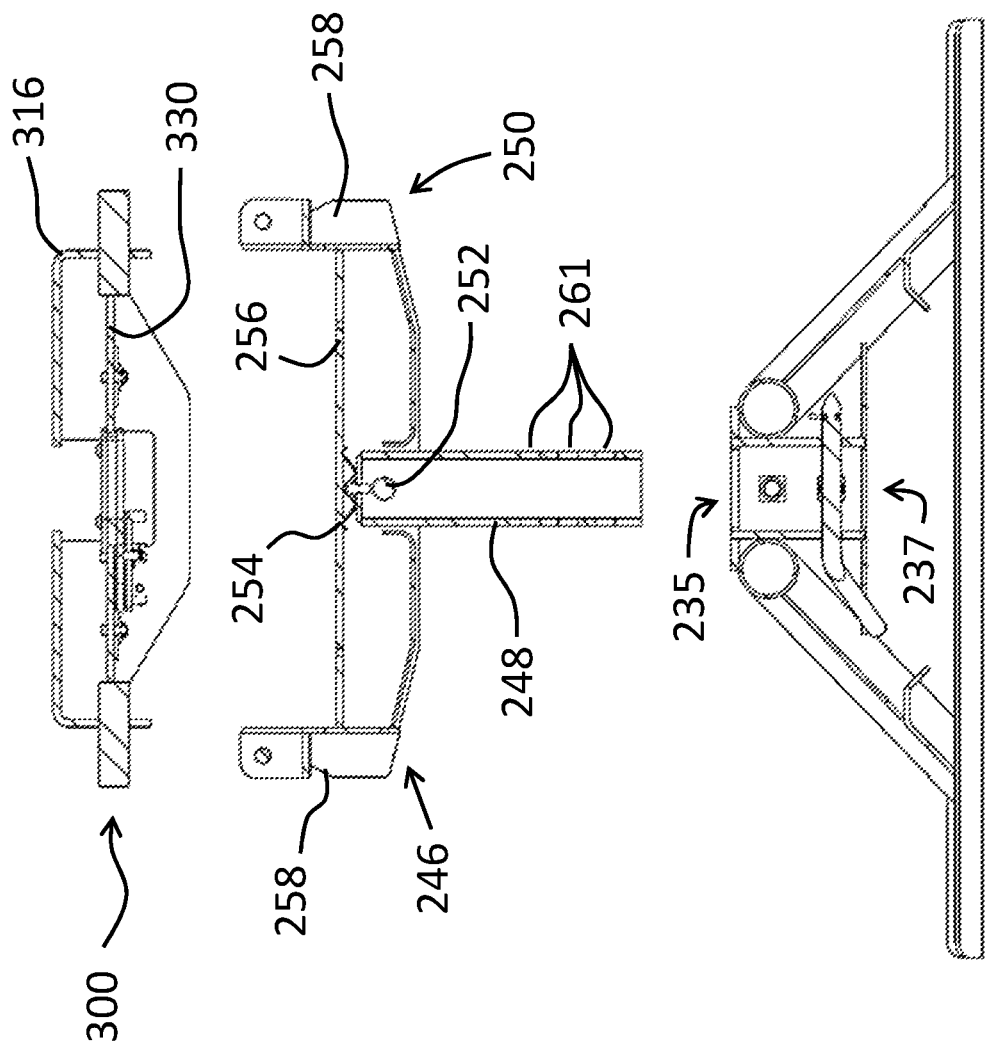

BALL HITCH FIFTH WHEEL

CROSS REFERENCE TO RELATED APPLICATIONS

This application is a Continuation-in-Part of U.S. application Ser. No. 16/058,456, filed Aug. 8, 2018, which is a Continuation-in-Part of U.S. application Ser. No. 15/205,508, filed on Jul. 8, 2016, which claims the benefit and priority of U.S. Provisional Application Ser. No. 62/190,040, filed on Jul. 8, 2015, the disclosures of which are hereby incorporated by reference.

BACKGROUND OF THE INVENTION

Traditional kingpin and fifth wheel hitches used on recreational vehicles are similar to those used on tractor trailer combinations and have the same disadvantages. The kingpin must be at a very specific height for its entry into the fifth wheel hitch. The operator of the vehicle must back into the kingpin when it is at its proper height. Performing this task can be nearly impossible in locations other than a large, level, and flat surface.

Another problem with traditional kingpin and fifth wheel hitches is the constraint of the trailer to rotate in a single plane. In a traditional fifth wheel hitch, the pin is locked with a jaw that restrictively limits the out of plane movement with respect to the hitch. While this may work for a tractor trailer combination, it is extremely undesirable for smaller vehicles. Traveling over uneven terrain will necessitate out of plane movement. A previous attempt to provide out of plane movement with a fifth wheel hitch has been to provide a pivot pin below the fifth wheel plate. This is done to provide a gimbaled connection and this allows the entire fifth wheel plate to pivot, but adds significant weight and complexity to the hitch.

An additional problem of traditional fifth wheel hitches and other hitches is difficulty in determining whether a secure connection has been made. The locking parts within a traditional fifth wheel hitch are not visible when the hitch is properly connected. As such, a user of such a hitch is required to test the connection before traveling. If this is not done, the user runs the risk of dropping the trailer. This unsafe situation can damage the towing vehicle as well as other vehicles near the towing vehicle. A more flexible system that provides assurance a proper connection has been made is needed for an ordinary recreational user that may lack the requisite skill to align a king pin in a fifth wheel hitch.

This present disclosure relates to hitch receivers and adapters, primarily for gooseneck and fifth wheel trailers. Many trailers utilize a fifth wheel kingpin. These trailers require a bed-mounted kingpin receiver and skid plate to receive and affix the trailer. These bed-mounted kingpin receivers consume a significant amount of space in the bed and commonly require bed mounted rails. The kingpin devices are frequently heavy and difficult to maneuver. Many users tow different styles of trailer, which require different vehicle mounts. One of these mounts is a gooseneck ball. The gooseneck ball is unobtrusive and mounted near the bed floor. In use, it protrudes above the floor, but is commonly removable to allow the bed of the vehicle to be unobstructed so it can be used for other purposes. The location of the gooseneck ball is determined by the manufacturer of the vehicle and typically, there is no adjustment provision made for the location of the gooseneck ball. Due to the absence of any adjustment for the location of the gooseneck ball in the bed, the distance between the gooseneck ball and the cab of a pickup is fixed. A user towing different types of trailers may find that lack of adjustment in the location of the ball inconvenient when towing different trailers. This inconvenience is particularly exacerbated by the fact that typical hitch assemblies that have been used as an adapter connecting to existing gooseneck offer no adjustment of the location of the trailer attachment with respect to the gooseneck ball. The ability to move the trailer attachment point with respect to the gooseneck ball is useful to change the distance between the trailer and cab of the pickup towing the trailer. Some trailers need more distance than others from the cab to facilitate turning without the trailer hitting the cab.

Some trailer frame manufacturers will void the warranty of the frame if adapters or other extensions are added to the kingpin on the trailer. Adding length increases bending moments and forces that are not otherwise anticipated. In some cases, the user has a bed-mounted hitch ball but cannot add an extension or other adapter to their trailer. In this case, a device that mounts to the existing bed-mounted ball that can connect to a fifth wheel kingpin is needed.

In addition to the issues mentioned above, current fifth wheel hitches have bed rails that are rigidly affixed to their frames. The rigid connection of the bed rails to the fifth wheel hitch means that as forces act on the hitch, those forces are transferred directly to the bed via the bed rails. Those forces will cause damage over time due to the fact that the bed of a towing vehicle is not sufficiently rigid withstand such forces. An improved device is needed.

SUMMARY OF THE INVENTION

The present invention is for a fifth wheel hitch that is useful for receiving a coupler that may be in the shape of a ball. The fifth wheel hitch has a frame that is mountable to a vehicle surface. The frame includes an outer sleeve that is fixed with respect to the frame. A receiver tube is telescopingly received inside the outer sleeve and moveable longitudinally with respect to the outer sleeve. The receiver tube has an upper end, a lower end, and a support wall within the receiver tube that is located between the upper and lower ends. The receiver tube is selectively lockable with respect to the outer sleeve. Additionally, the outer sleeve may include a fastener driven through it that is adapted for impinging on the receiver tube. The receiver tube and outer sleeve may both have apertures through them that are alignable and adapted for receiving a pin to lock the receiver with respect to the outer sleeve. Further, a catch pin may be retractably located in the receiving tube so that in a first position it acts to restrain a hitch ball placed within the receiver, and in a second withdrawn position, the hitch ball is free to be removed from the receiver.

The present disclosure describes a frame that can be affixed to a towing vehicle through a vehicle-mounted ball. The vehicle-mounted ball is commonly used with a gooseneck trailer setup. The vehicle-mounted ball is attached to the towing vehicle, commonly in the bed of a pickup truck. In the present disclosure, a ball cage is placed over the vehicle-mounted ball and the ball is captured in the cage by pins that secure and prevent the ball from being removed. A frame has a cage pocket that is sized to receive the ball cage in one of two orientations. The ball cage has a threaded fastener that extends through an elongate hole in the frame that allows the frame and ball cage to be drawn together. Because the ball cage is attached to the vehicle, the frame is drawn down to the vehicle and secured.

Attaching to a vehicle-mounted ball is a non-rigid connection that allows movement of the hitch with respect to the towing vehicle. Shifting of the fifth wheel hitch with respect to the bed of the towing vehicle can damage the bed unless the bed is protected from the shifting of the fifth wheel hitch. Bed supports overlie the bed and the frame has foot portions that slide with respect to the bed supports. As such, the frame of the fifth wheel hitch and its foot portions may slide with respect to the bed supports, which mitigates damage to the bed.

A plate and rocker assembly may be used with the fifth wheel hitch that requires no adapters or other modifications to be placed on the trailer. The hitch mounts to the vehicle-mounted ball and provides a standard kingpin receiver skid plate. The receiver plate is connected to a rocker assembly that has a tube that extends downwardly therefrom. The tube is received by a sleeve portion in the frame and can be affixed thereto in different vertical positions. The skid plate has a rotating lock that captures the kingpin in the locked position.

BRIEF DESCRIPTION OF THE DRAWINGS

A preferred embodiment of this invention has been chosen wherein:

FIG. 40 is an exploded view of the hitch assembly shown in FIG. 26 through the hitch plate pivot pin.

DESCRIPTION OF THE PREFERRED EMBODIMENT

Figure 1:
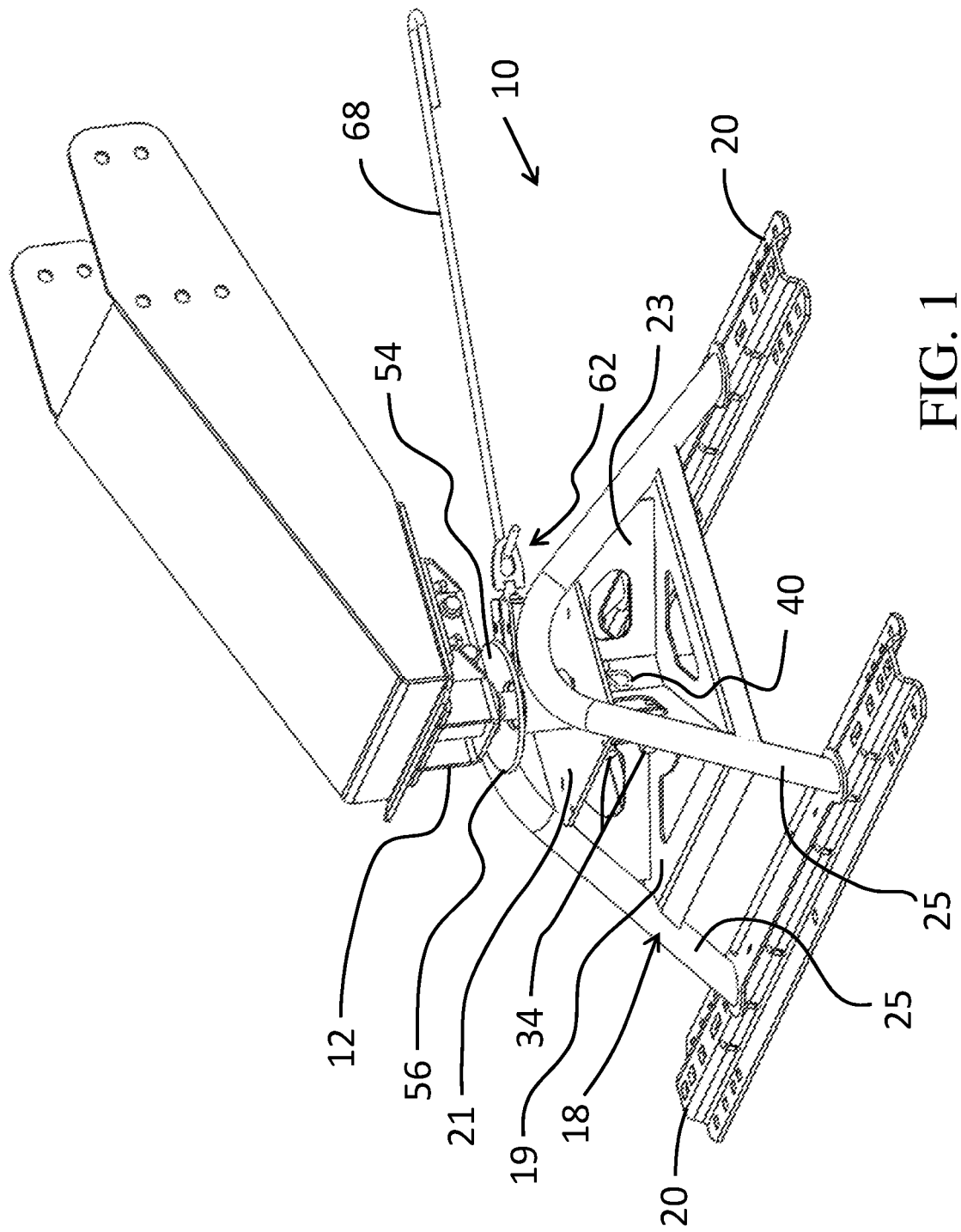
FIG. 1 is a perspective view of the fifth wheel hitch.

FIG. 1 shows a view of a fifth wheel hitch 10 as it is used with a pin box 12 of a mating trailer. The trailer is not shown but may be a recreational vehicle or other trailer that would be towed using a fifth wheel in a pickup truck or other towing vehicle capable of supporting a fifth wheel hitch. For the purposes of this description hereinafter, a pickup truck will be considered the towing vehicle.

Figure 2:
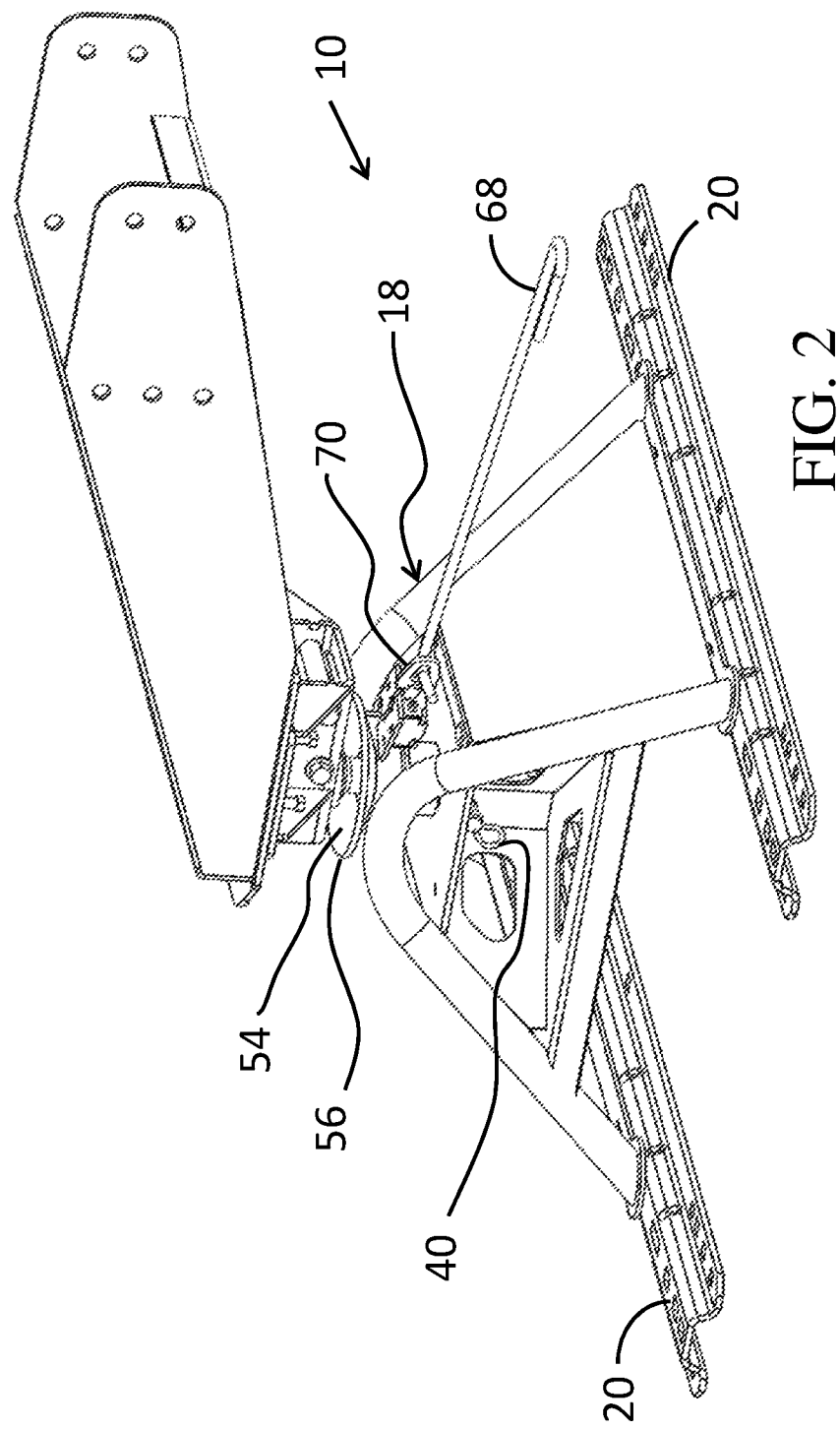
FIG. 2 is another perspective view of the fifth wheel hitch shown in FIG. 1.
Figure 3:
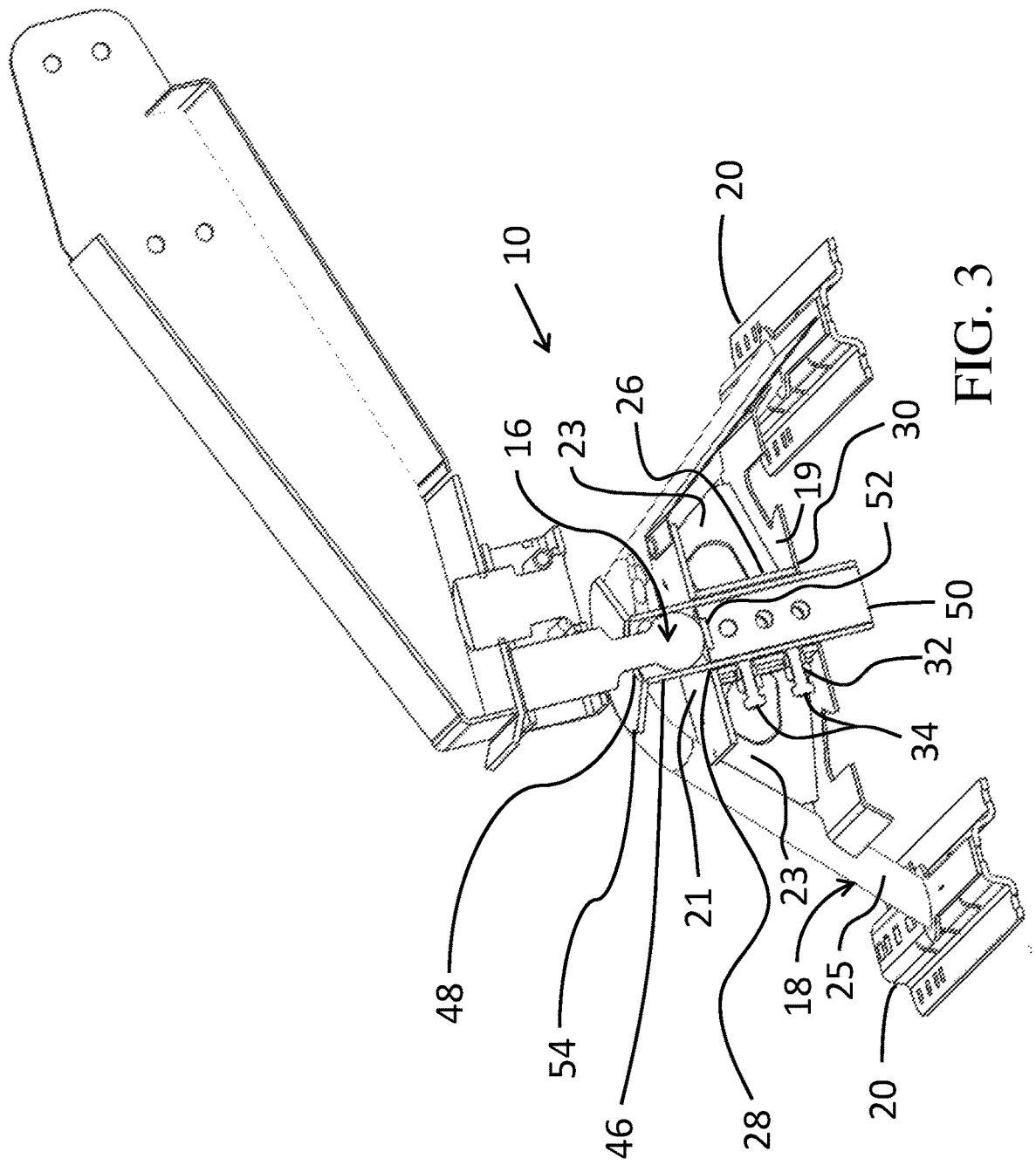
FIG. 3 is a sectional view of the fifth wheel hitch shown in FIGS. 1 and 2 taken about the centerline of the hitch ball.
Figure 4:
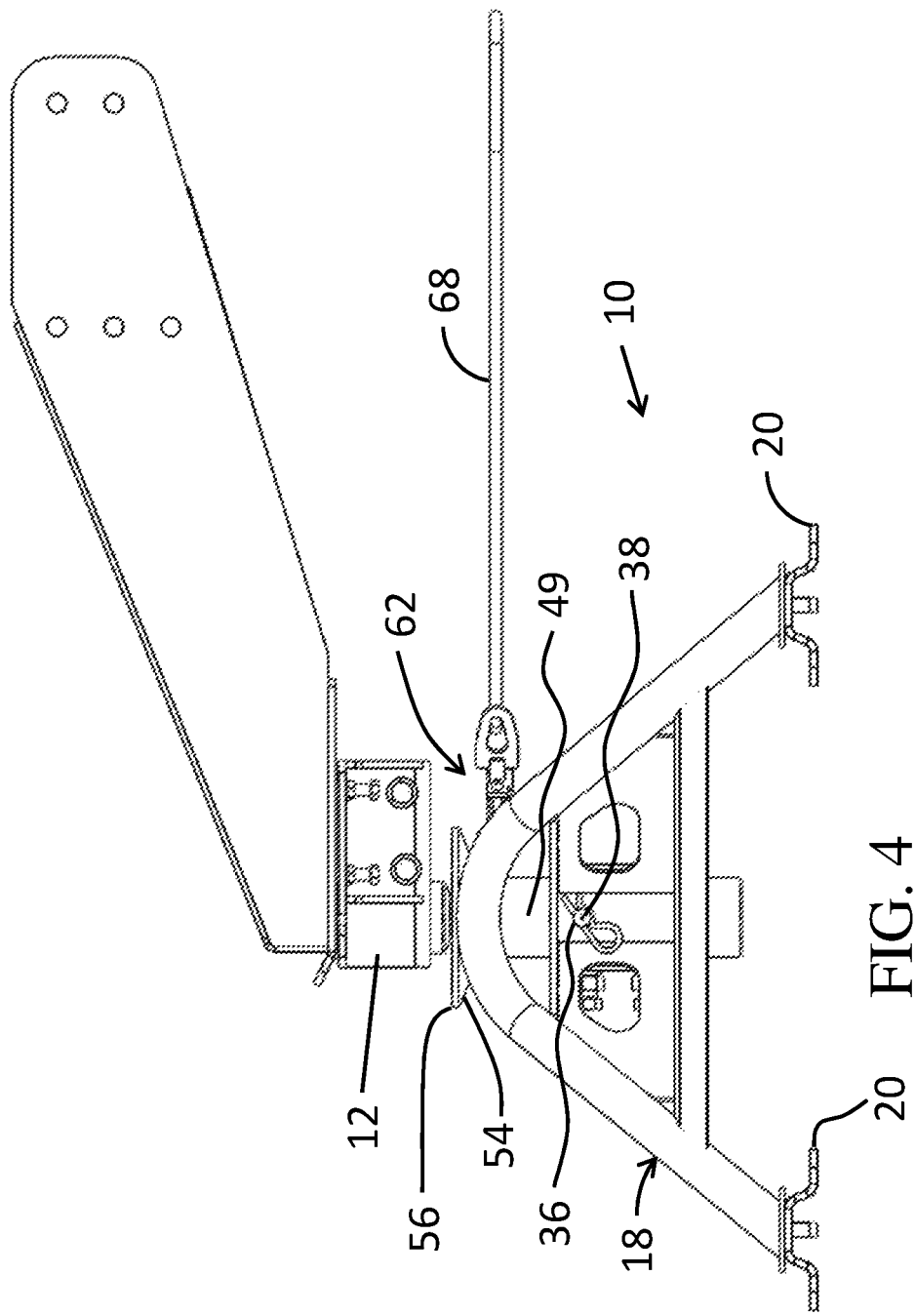
FIG. 4 is a side view of the fifth wheel hitch shown in FIGS. 1-3.

The fifth wheel hitch 10 is used with a hitch ball 16 that extends downwardly from an adapter 12 that is attached to a pin box 11. The pin box adapter 12 is adapted to receive a kingpin on a fifth wheel trailer (not shown). A hitch ball 16 is shown, but it is not absolutely necessary that the hitch ball 16 that acts as a coupling member be a complete ball. Production of a ball is a simple way to achieve the goals of this invention and provides rounded contact surfaces that assist the function of the invention. It is possible that the coupling member, which is shown as a hitch ball 16 in the figures, be a non-spherical shape or a partially spherical shape. Having the lowermost portion of the hitch ball 16 as a spherical shape is generally advantageous to facilitate smooth movement. The hitch ball 16, or more generally hitch 16, is best seen in FIG. 3. The hitch 16 provides multiple degrees of freedom for rotation when it is connected to the fifth wheel hitch 10. The fifth wheel hitch 10 has a frame 18 that is adapted to be mounted into the bed of a pickup truck. The frame 18 shown in FIGS. 1-3 has horizontal bed rails 20 that are mounted to the bed. However, the frame 18 may be of the type that has downwardly extending mounting lugs that are adapted to mate with the pickup manufacturers' sockets that may be provided as original equipment or as aftermarket accessories. The frame 18 shown in FIGS. 1-3 or one using lugs will work well with the concept of the present invention.

Figure 5:
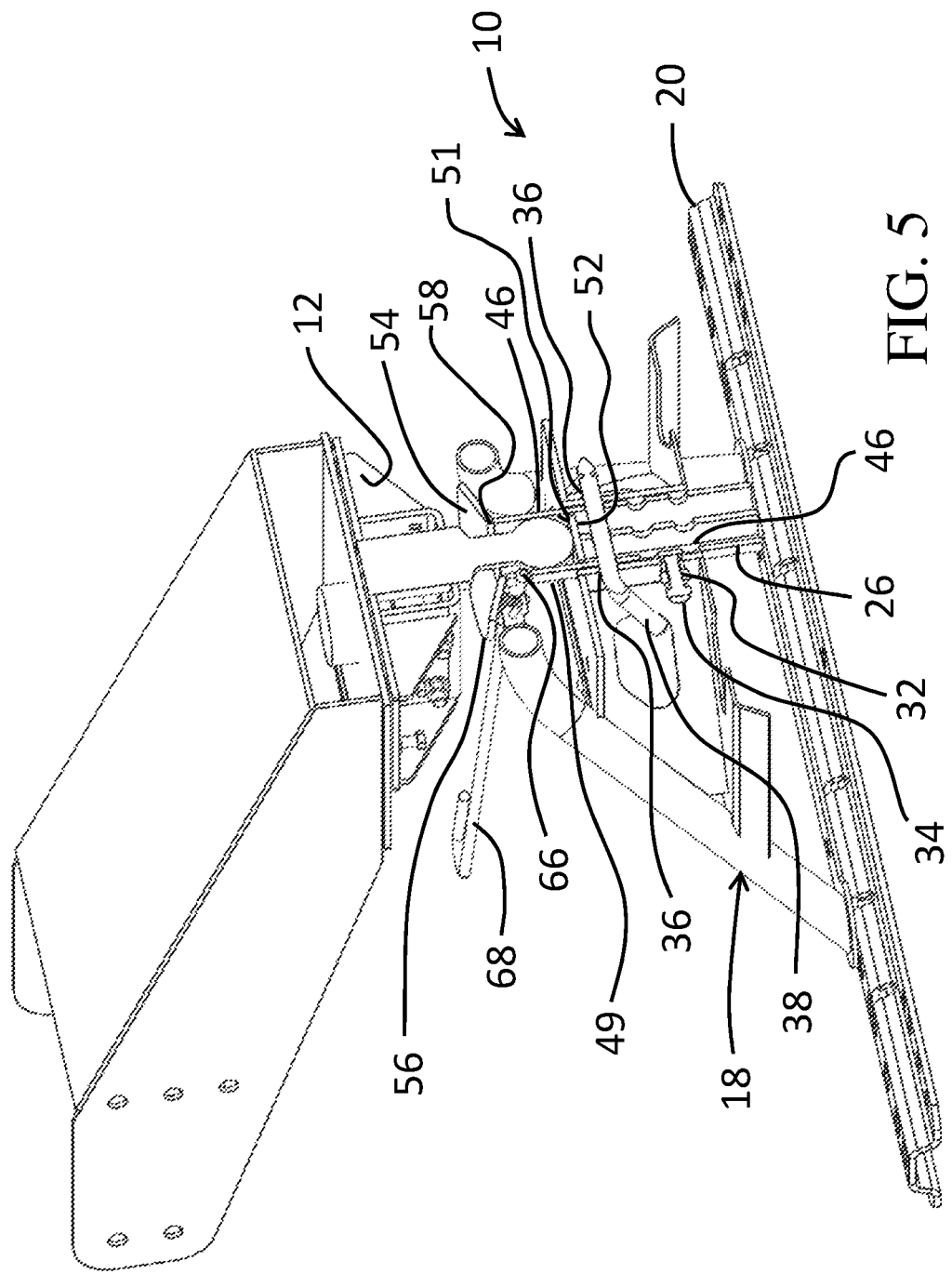
FIG. 5 is a perspective view of the fifth wheel hitch taken perpendicularly to that of FIG. 2 through the center of the hitch ball.

The frame 18 includes an outer sleeve 26 that is welded within the frame 18. The outer sleeve 26 includes an upper end 28 and a lower end 30. The frame 18 includes a lower planar wall 19 and an upper planar wall 21 where the outer sleeve 26 is affixed. Located between the lower and upper planar walls 21, 19 are vertical walls 23. The frame further includes bent tubular members 25 where the walls 19, 21, 23 are affixed. The outer sleeve 26 is affixed to the vertical walls 23 to provide additional rigidity. The outer sleeve 26 also includes threaded holes 32 that are best shown in FIG. 5. The threaded holes 32 include bolts 34 that extend into the outer sleeve 26. The outer sleeve 26 includes aligned transverse holes 36 on opposite sides of the outer sleeve 26 that are perpendicular to the threaded holes 32. These transverse holes 36 are adapted to receive a pin 38 that extends through the outer sleeve 26. The pin 38 is bent downwardly at one end and cannot be passed through its corresponding hole 36. The opposite end of the pin 38 receives a cotter pin 40 that holds the pin in the transverse holes 36 on an opposite side of the outer sleeve 26. It is contemplated that the cotter pin 40 could be replaced with an E-clip, snap ring, or other mechanical fastening device. A receiver tube 46 is slidingly and telescopically received in the outer sleeve 26. The outer sleeve 26 is coaxially aligned with receiver tube 46 shown in FIG. 3. The receiver tube 46 has an upper end 48 and a lower end 50. The receiver tube 46 is defined by a continuous sidewall 47 having an outer surface 49 and an inner surface 51. The receiver tube 46 is shown as a cylindrical cross section, but it is contemplated that the receiver tube 46 could be a rectangular or other enclosed polygon shape. A support wall 52 is located near the upper end 48 of the receiver tube 46. The support wall 52 is welded into the receiver tube 46 and is adapted for supporting the weight of the hitch ball 16. A receiver pocket 53 is defined by the inner surface 51 of the receiver tube 46, the upper end 48 and the support wall 52. The support wall 52 is adjustable with respect to the outer sleeve 26 and may be adjusted to a height that locates the support wall 52 within the outer sleeve 26. The receiver tube 46 has a funnel 54 located at its upper end 48. The funnel 54 has an upper edge 56 that defines its outer diameter and the funnel 54 has an inner diameter 58 that is concentrically aligned with the receiver tube 46 inner surface 51 that defines the inner diameter of the receiver tube 46. The funnel 54 extends well outwardly of the outer surface 49 of the receiver tube 46. As such, the funnel 54 is cantilevered with respect to the receiver tube 46. It is possible that gussets may be added to support the funnel 54, but is generally not necessary if a thick enough material is chosen to make the funnel 54. The funnel 54 is adapted to guide the hitch ball 16 into the receiver tube 46. The receiver tube 46 has a series of transverse holes 61 that are selectively alignable with the holes 36 in the outer sleeve 26. When the holes 61 in the receiver tube 46 are aligned with the holes 36 in the outer sleeve 26, pin 38 may be inserted through the aligned holes 61, 36 to selectively lock the vertical position of the receiver tube 46 with respect to the outer sleeve 26 and frame 18.

Figure 6:
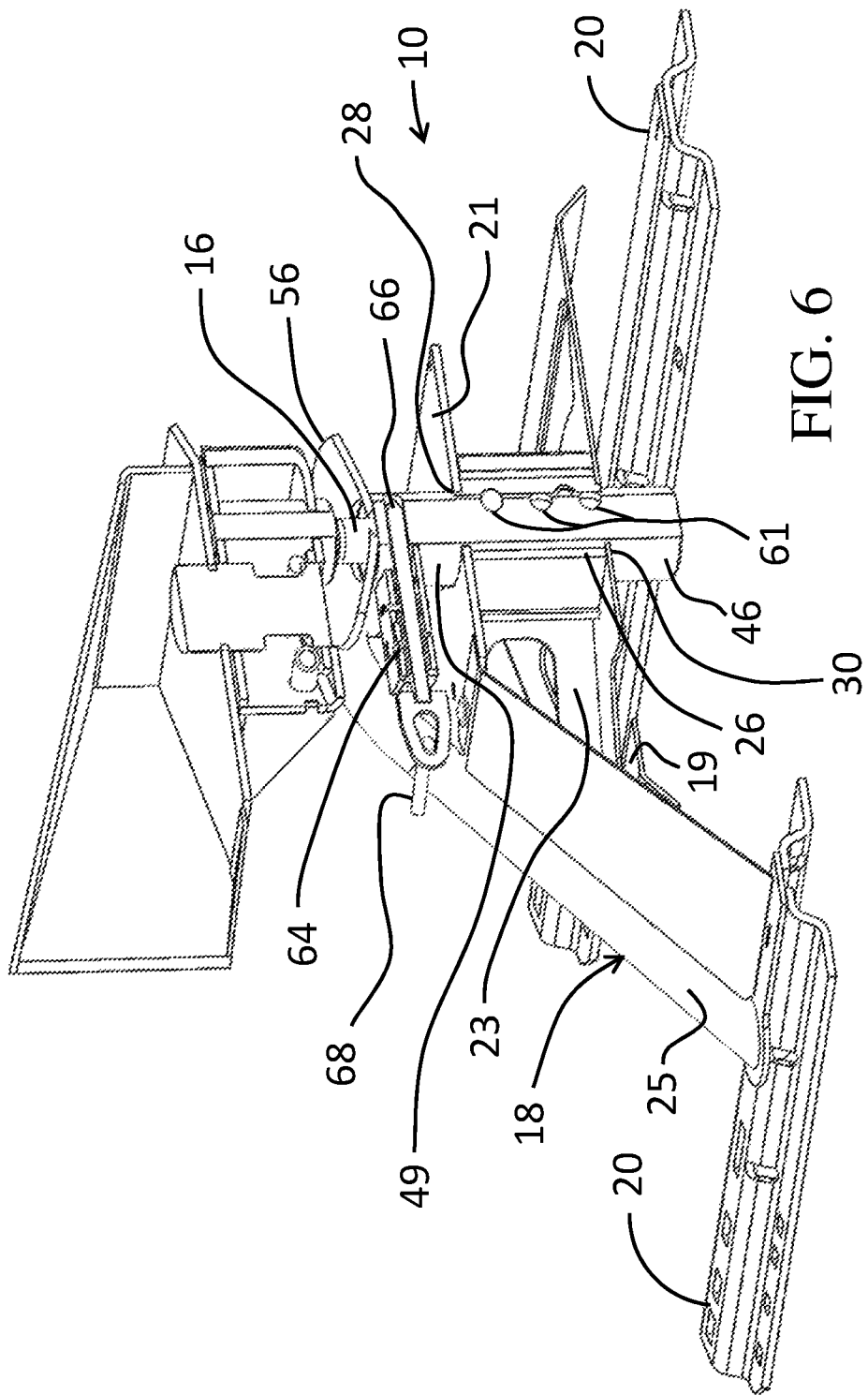
FIG. 6 is sectional view of the fifth wheel hitch taken through the center of a spring loaded locking pin.
Figure 7:
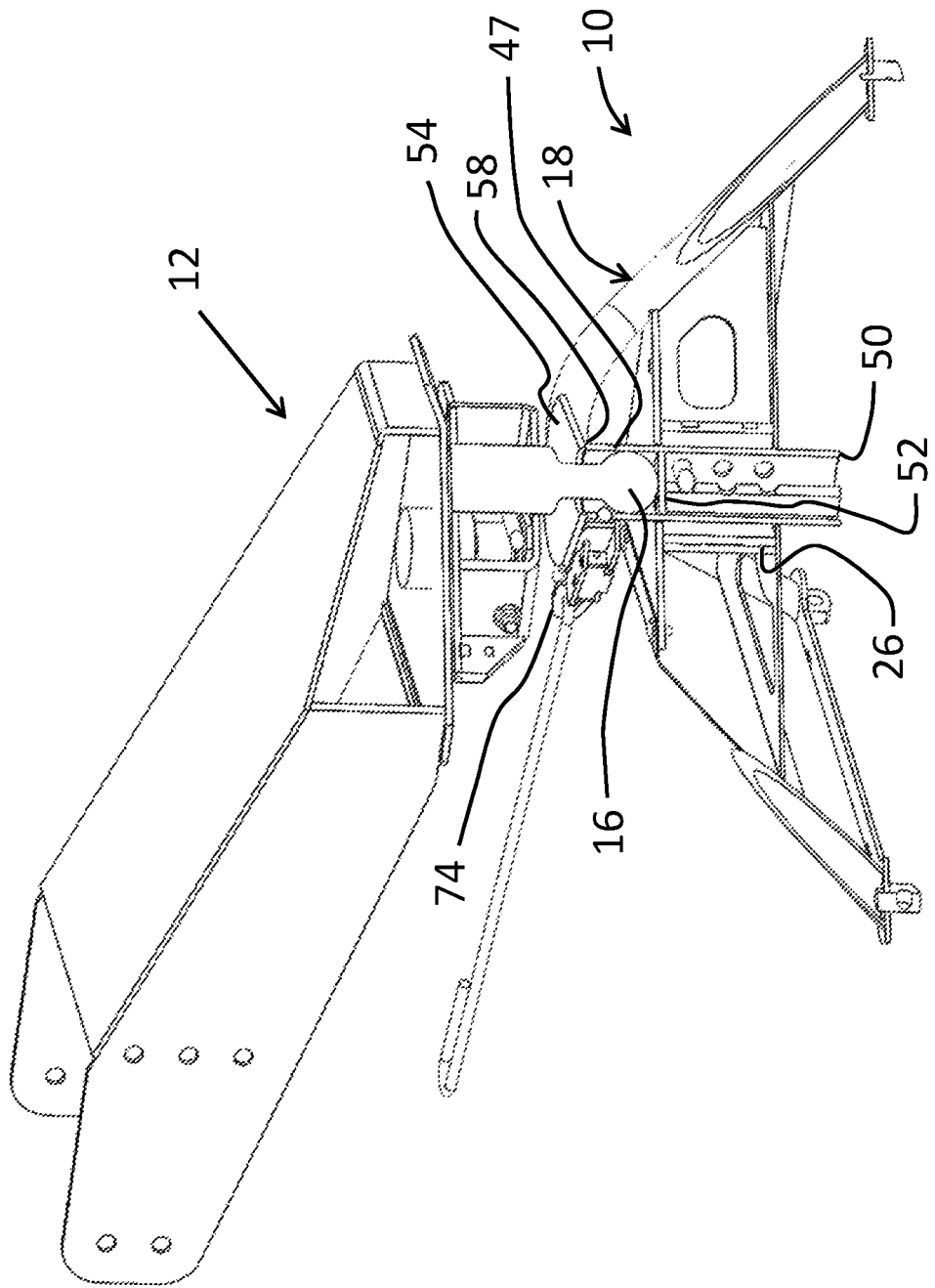
FIG. 7 is a sectional view of an embodiment of a locking mechanism that uses a non-spring pin for locking.
Figure 8:
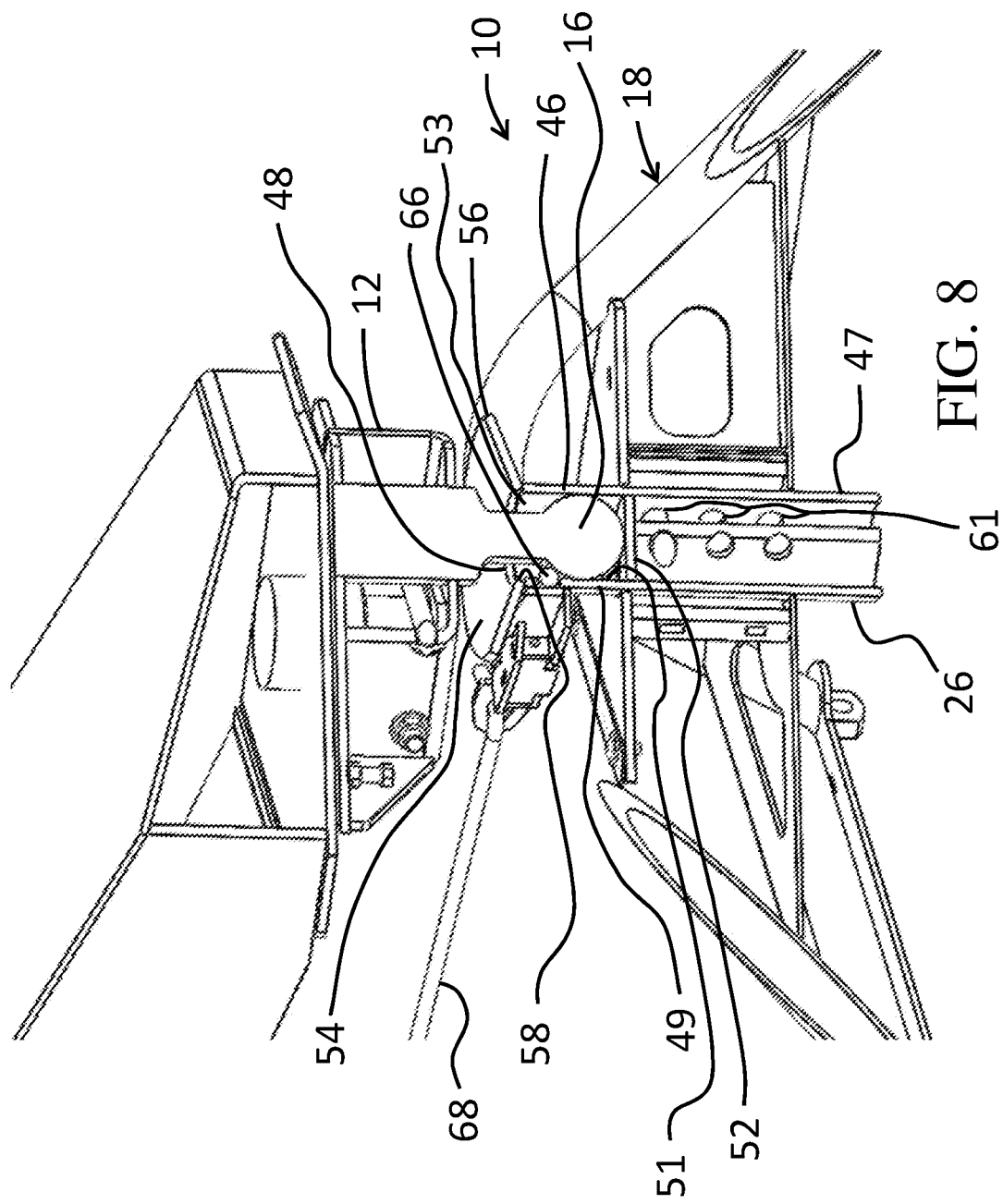
FIG. 8 is a magnified view of the sectional view shown in FIG. 7.
Figure 9:
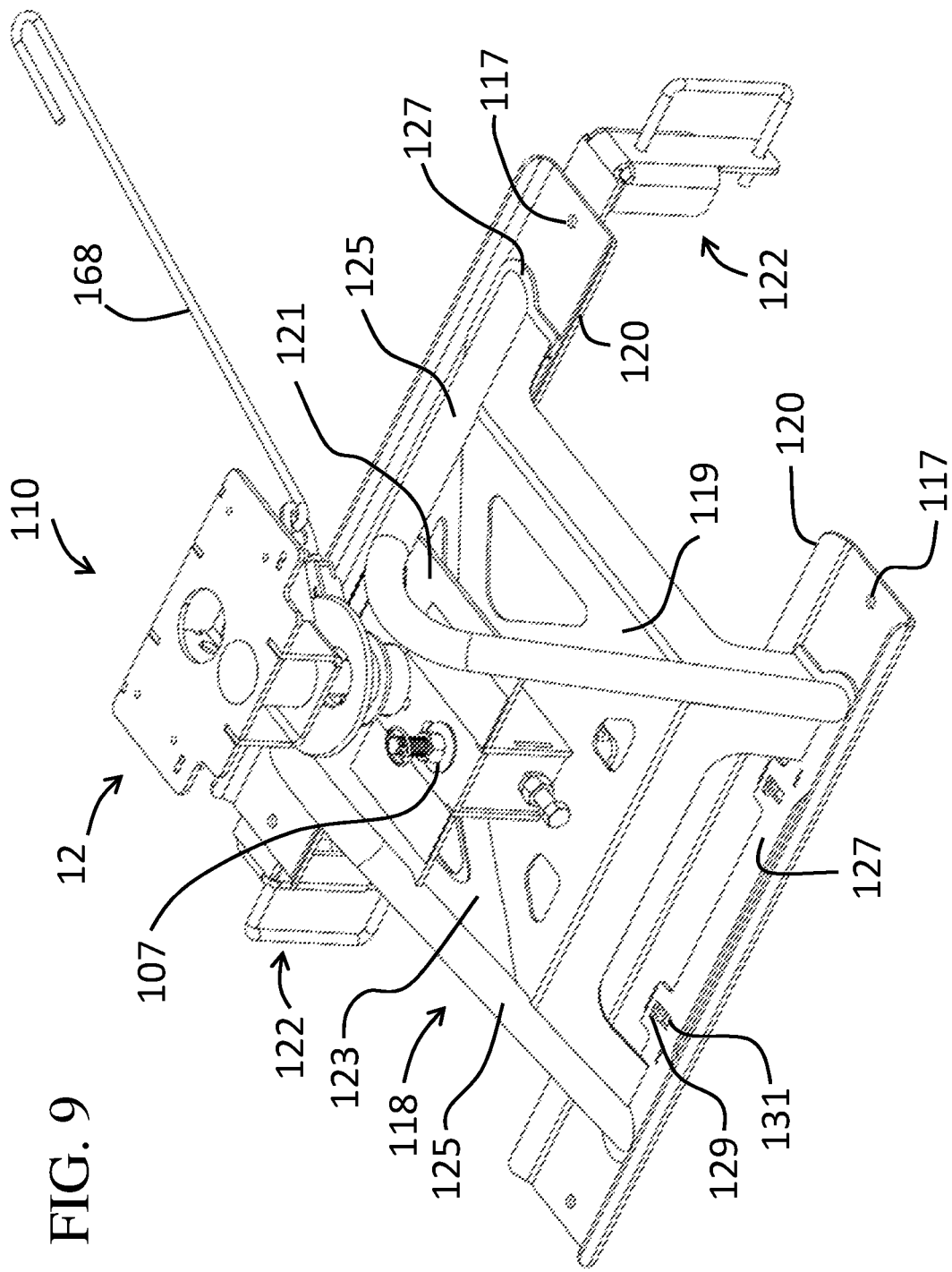
FIG. 9 is an isometric view of the single point hitch.
Figure 10:
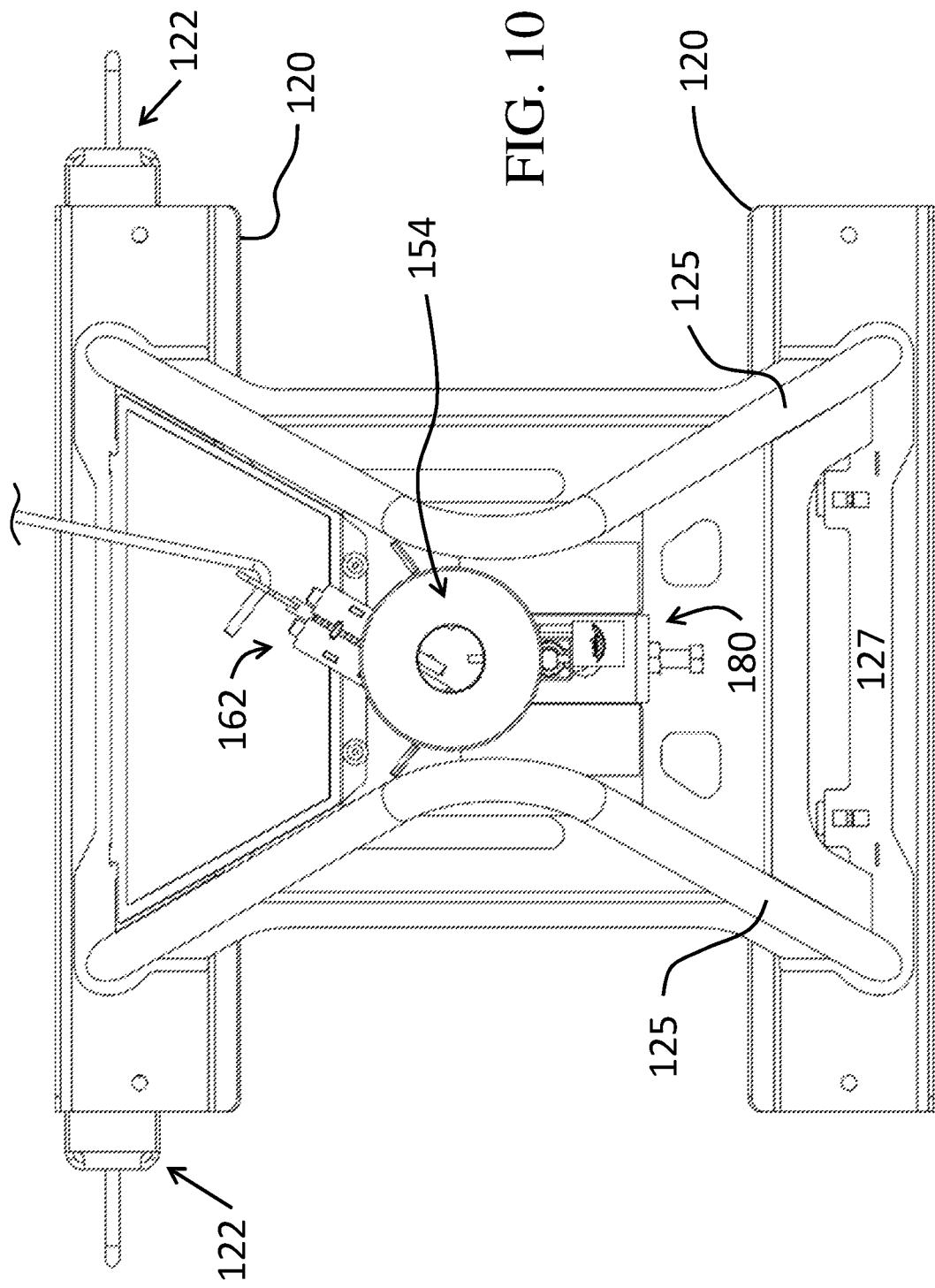
FIG. 10 is a top view of the single point hitch.
Figure 11:
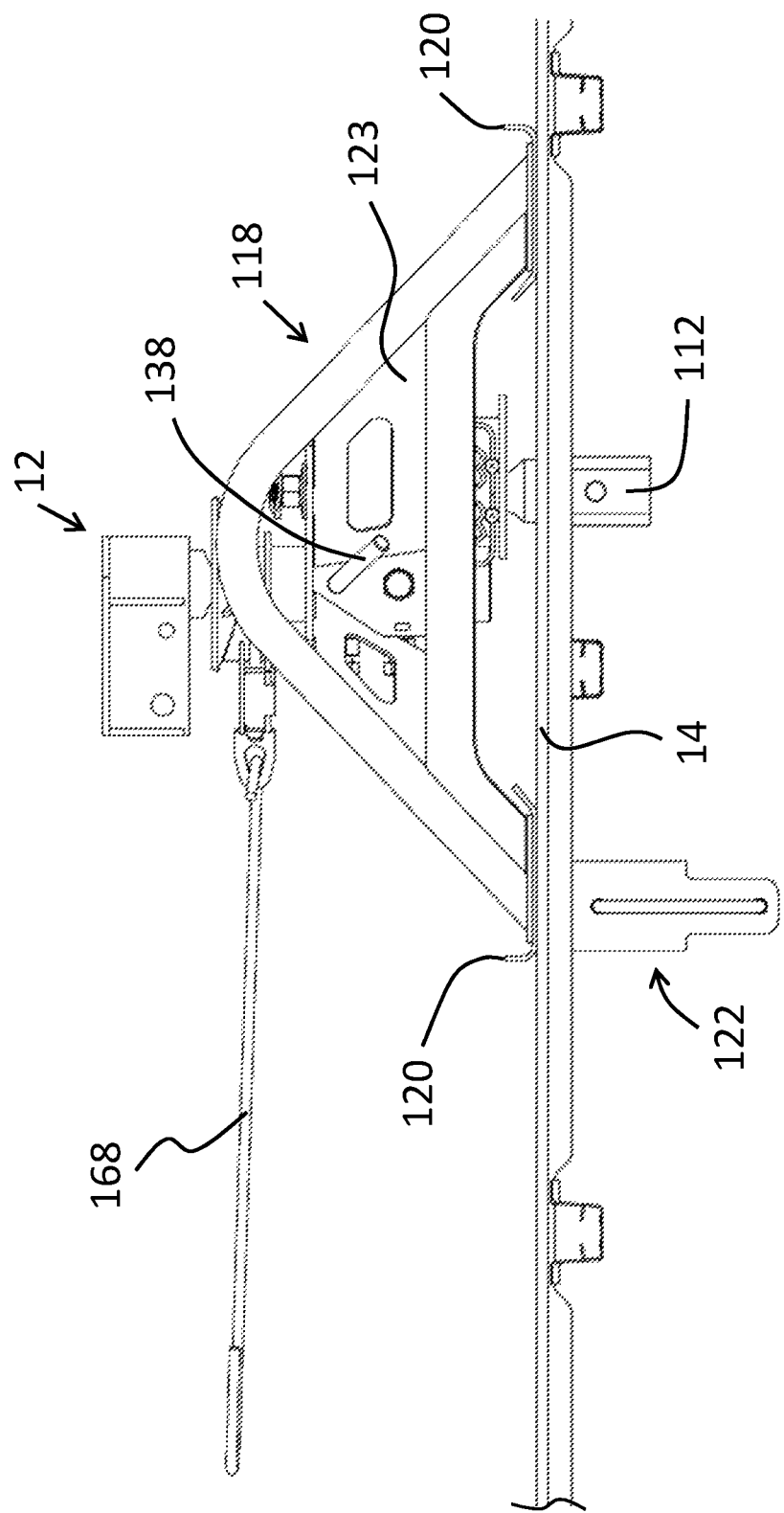
FIG. 11 is a right side view of the single point hitch as affixed to a towing vehicle.
Figure 12:
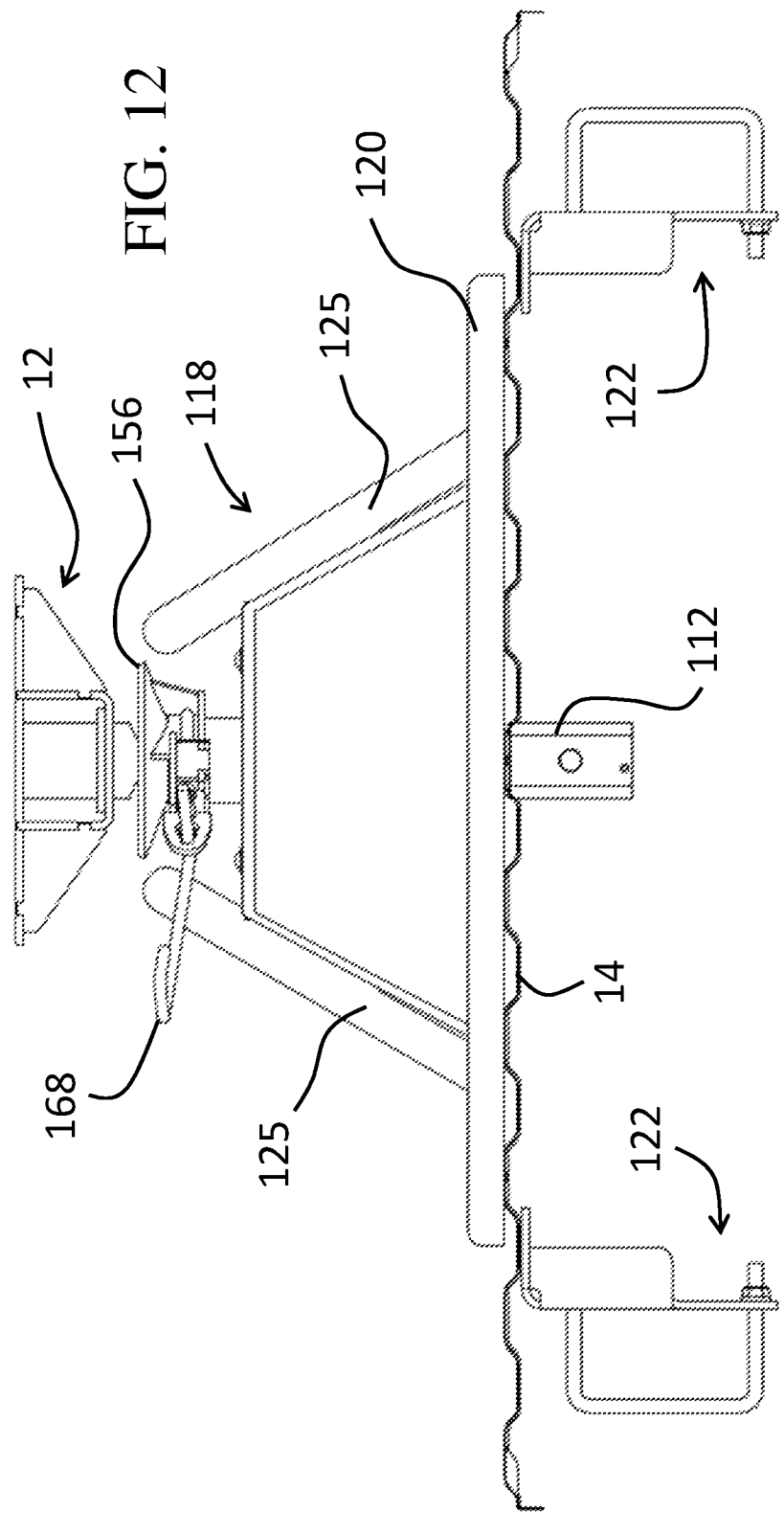
FIG. 12 is a rear view of the single point hitch as affixed to a towing vehicle.
Figure 13:
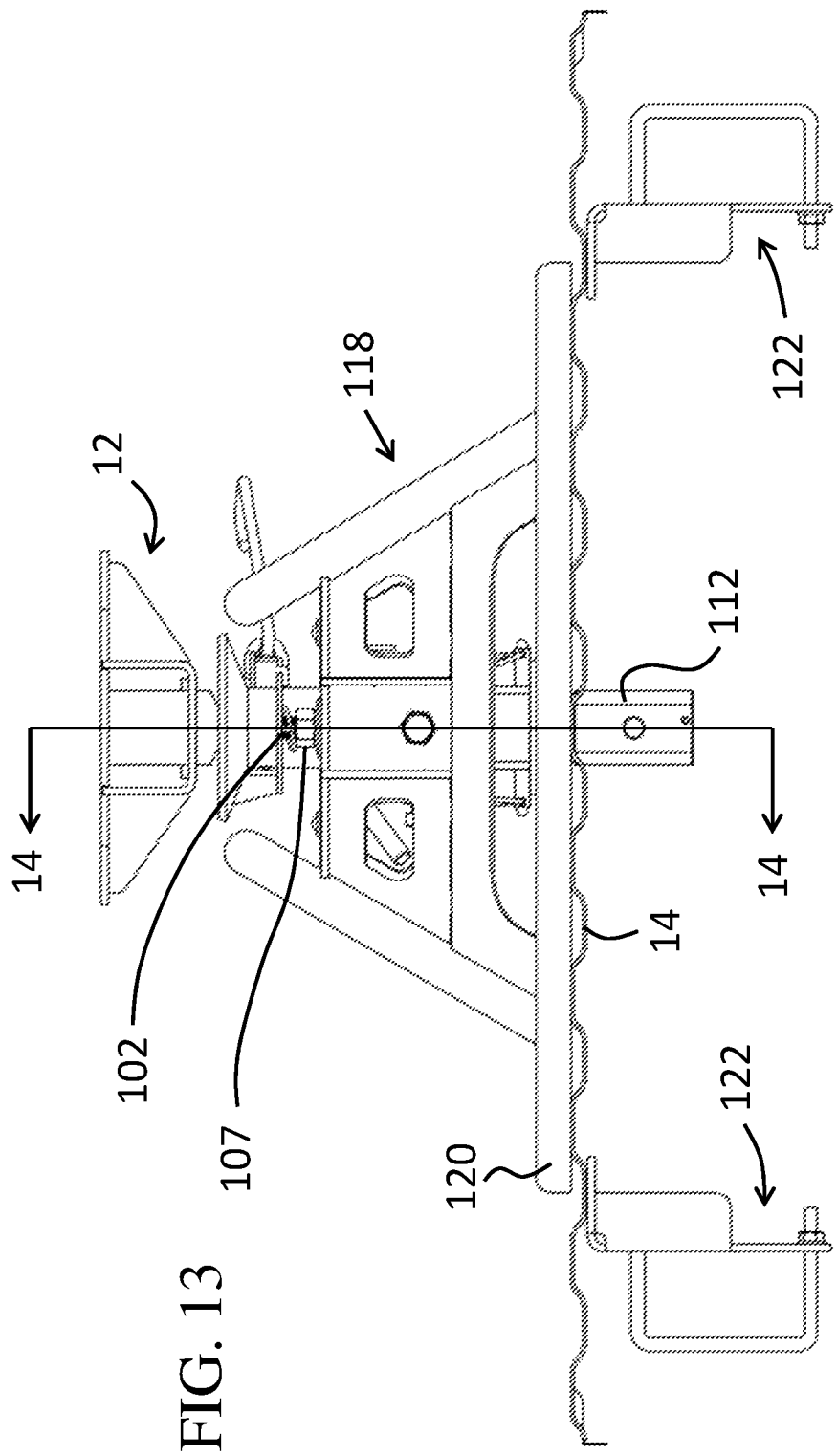
FIG. 13 is a front view of the single point hitch as affixed to a towing vehicle.

A locking mechanism 62 is located on the receiver tube 46. The locking mechanism 62 is near the upper end 28 of the receiver tube 46 is adapted to retain the hitch ball 16 within the receiver tube 46. The pin 66 is chordally located with respect to the center of the diameter of the receiver tube 46. In other words, the pin 66 is offset from the center of the receiver tube 46. The side of the pin 66 is adapted to prevent upward movement of the hitch ball 16 from the receiver tube 46 as can be seen in FIG. 6. A first position is shown in FIG. 6 and corresponds to a locking position that acts to retain the hitch ball 16 in the receiver tube. The pin 66 is movable away from the receiver tube 46 so that the pin is retracted from the receiver tube 46, and this corresponds to a second and unlocked position of the pin 66 that allows removal of the hitch ball 16 from the receiver tube 46. The pin 66 may be retracted by a pull rod 68 that is inserted into loop 70 of the pin 66 and pulled away from the receiver tube 46. The pin 66 serves to lock the hitch ball 16 within the receiver tube 46 when the pin 66 is in its first position.

A user of the fifth wheel hitch 10 will first determine the height above the truck bed that is desired and set the height of the receiver tube 46 with respect to the frame 18. This is done by removing the pin 38 from the outer sleeve 26 and the receiver tube 46. Holes in the receiver tube 61 and outer sleeve 36 are aligned at the desired height and the pin 38 is inserted through the aligned holes 61, 36. The cotter pin 40 or other mechanical locking device is then snapped into the pin 38 to prevent it from being dislodged from the holes 61, 36. To further lock the receiver tube 46, bolts 34 are tightened against the receiver tube 46. This not only locks the receiver tube 46 with respect to the outer sleeve 26 but serves to prevent rattling of the receiver tube 46. The rattling would be felt by a driver of the towing vehicle and the bolts 34 provide a more responsive connection during towing. With the receiver tube 46 set at the proper height, the driver of the towing vehicle will back the vehicle, to which the fifth wheel hitch 10 is attached, underneath the hitch ball 16 of the trailer to be towed. It is not critical that the hitch ball 16 on the trailer be in the same plane as the receiver tube 46. When the receiver tube 46 is near the hitch ball 16 the driver will stop the vehicle and lower the hitch ball 16 into the receiver tube 46. The funnel 54 assists in this effort because the hitch ball 16 need only be near the receiver tube 46 and the hitch ball 16 will be guided into the receiver tube 46. The user of the fifth wheel hitch 10 knows with absolute certainty that a secure connection is made to the hitch ball 16 because he can see the receiver tube 46 and the hitch ball 16 as they connect and the receiver tube 46 completely circumscribes the hitch ball 16. The pin 66 of locking mechanism 62 must be moved into the second position (withdrawn from the receiver tube 46), which will allow the hitch ball 16 to rest on the support wall 52. The pin 66 will be biased into its first, locked position by spring 64. The biasing spring 64 will serve as an effective mechanism to prevent the pin 66 from retracting.

A single point adaptation of the hitch 110, shown in FIGS. 9-25, has the capability to affix to a bed-mounted hitch ball 112 which is affixed to a towing vehicle 14. Bed-mounted hitch balls 112 are commonly used with gooseneck trailers (not shown). The hitch 110 is shown with a pin box adapter 12, frame attaching brackets 122, and bed supports 120. The frame attaching brackets 122 are attached to the frame of the vehicle to provide support underneath the bed surface of the vehicle 14 in the event that additional structure or reinforcement is needed. It is contemplated that the bed supports 120 may be fastened to the frame attaching brackets through apertures 117 that allow a fastener to pass through and affix the bed supports 120 to the vehicle 14. Otherwise, the bed supports 120 rest on the bed surface of the vehicle 14 and are held in place when the hitch 110 is attached to the vehicle 14. Generally, the bed supports 120 do not slide with respect to the bed surface of the towing vehicle 14 and the frame attaching brackets 122 provide as direct connection to the frame to ensure that the bed supports 120 do not slide with respect to the frame and bed surface. Often, frame attaching brackets 122 are not necessary. Many uses of the hitch 110 will have bed supports 120 that contact the surface of the bed and do not need any further connection to the bed other than resting upon the bed. In some cases it may be desirable to put a high friction coating on the lower surfaces of the bed supports 120 where they contact the bed. The bed supports 120 spread load placed on the hitch 110 and prevent damage to the bed. The bed supports 120 have portions that are bent upwardly to provide additional strength.

A frame 118 is formed from structural components that are welded, riveted, or otherwise fastened together. The frame 118 shares many components with frame 18 and also includes additional features. The fifth wheel hitch 110 of the present invention is used with a hitch ball 16 that extends downwardly from the pin box adapter 12 on the trailer. The fifth wheel hitch 110 of the present invention may also be used with a trailer that has a hitch ball 16 extending directly from the trailer. The hitch ball 16 provides multiple degrees of freedom for rotation when it is connected to the fifth wheel hitch 110.

Figure 22:
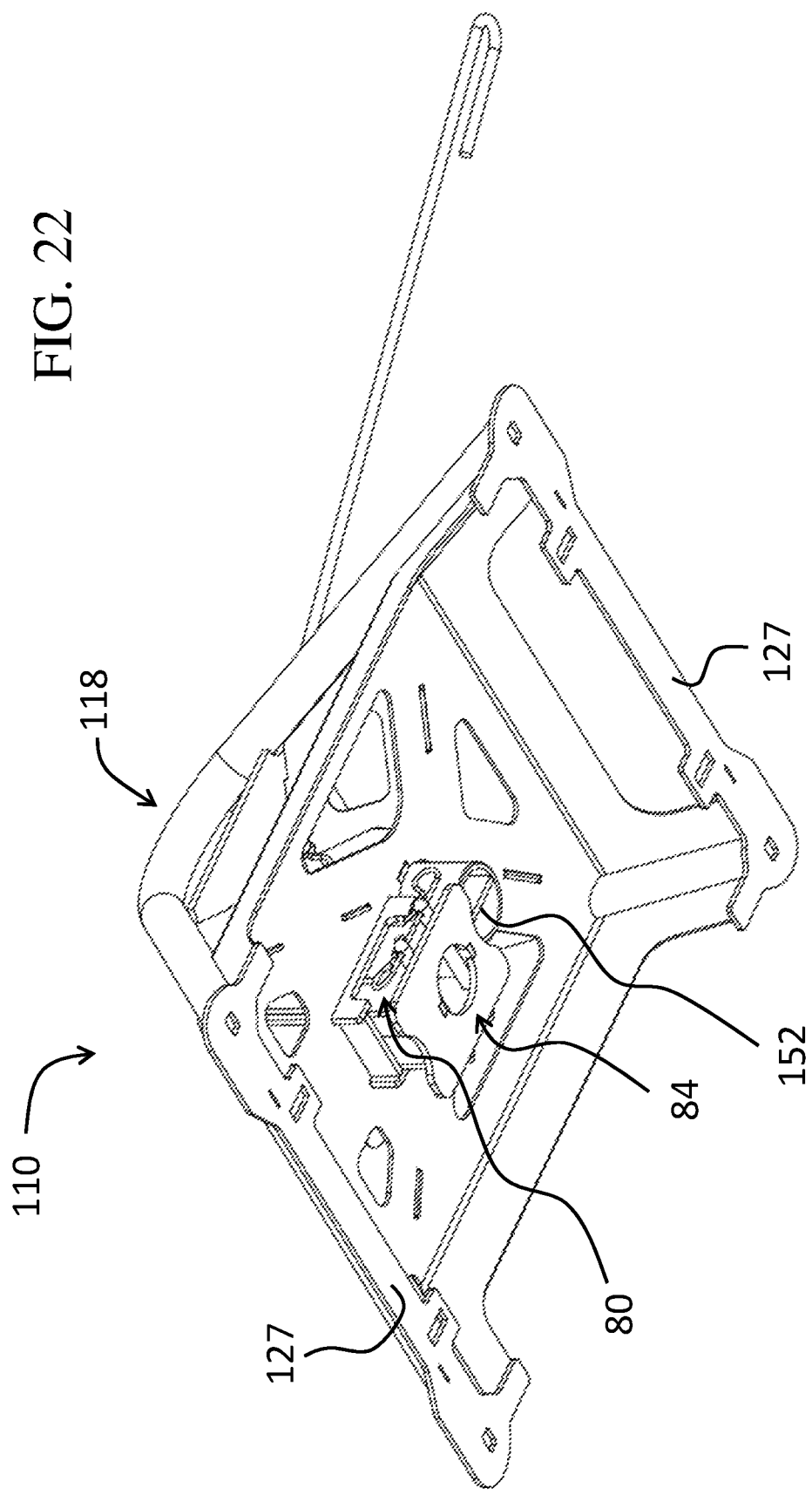
FIG. 22 is a bottom isometric view of the single point hitch.
Figure 23:
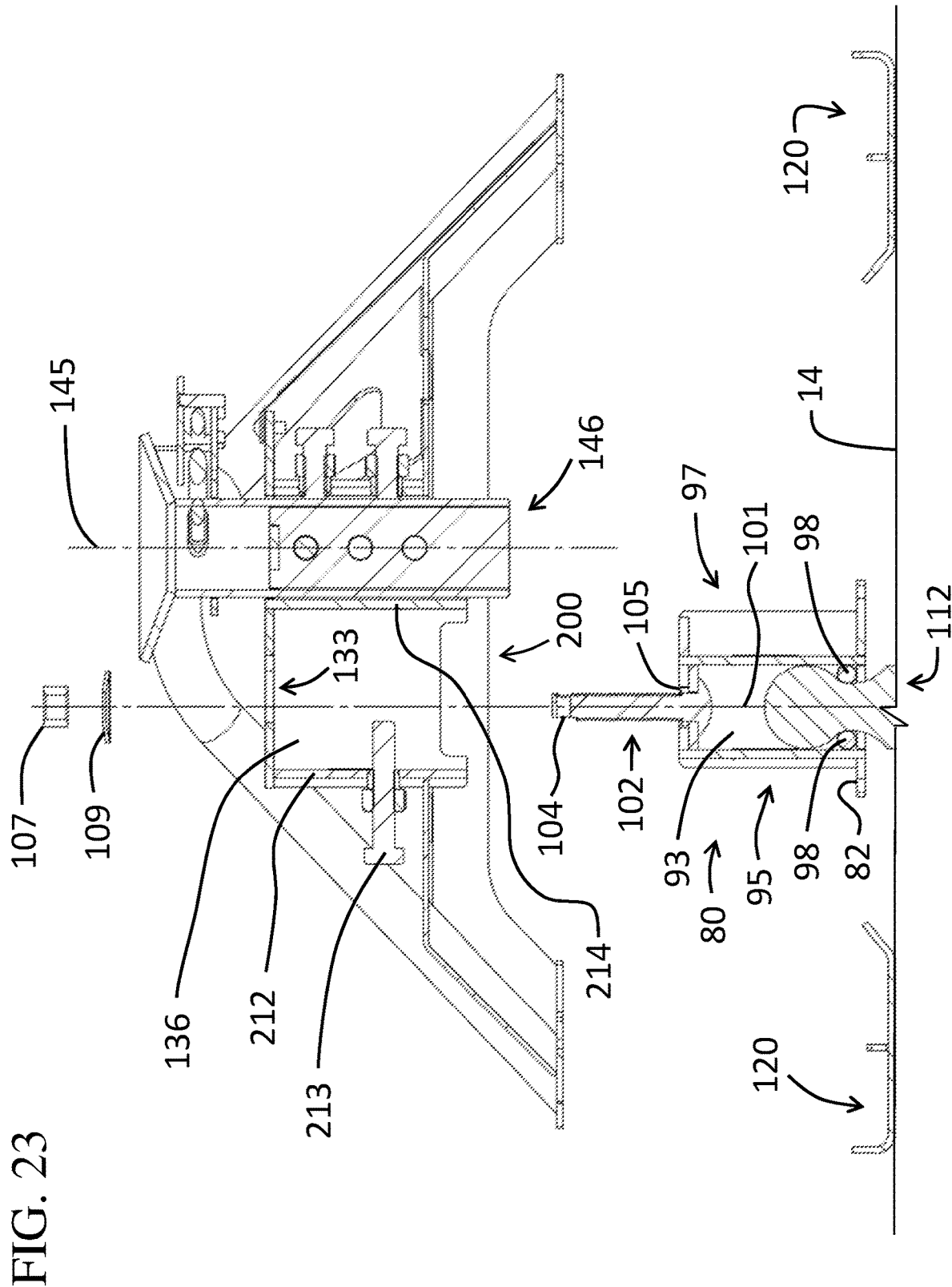
FIG. 23 is a side section view of the single point hitch in FIG. 17 with the ball cage in the orientation shown in partial view A in FIG. 17.
Figure 24:
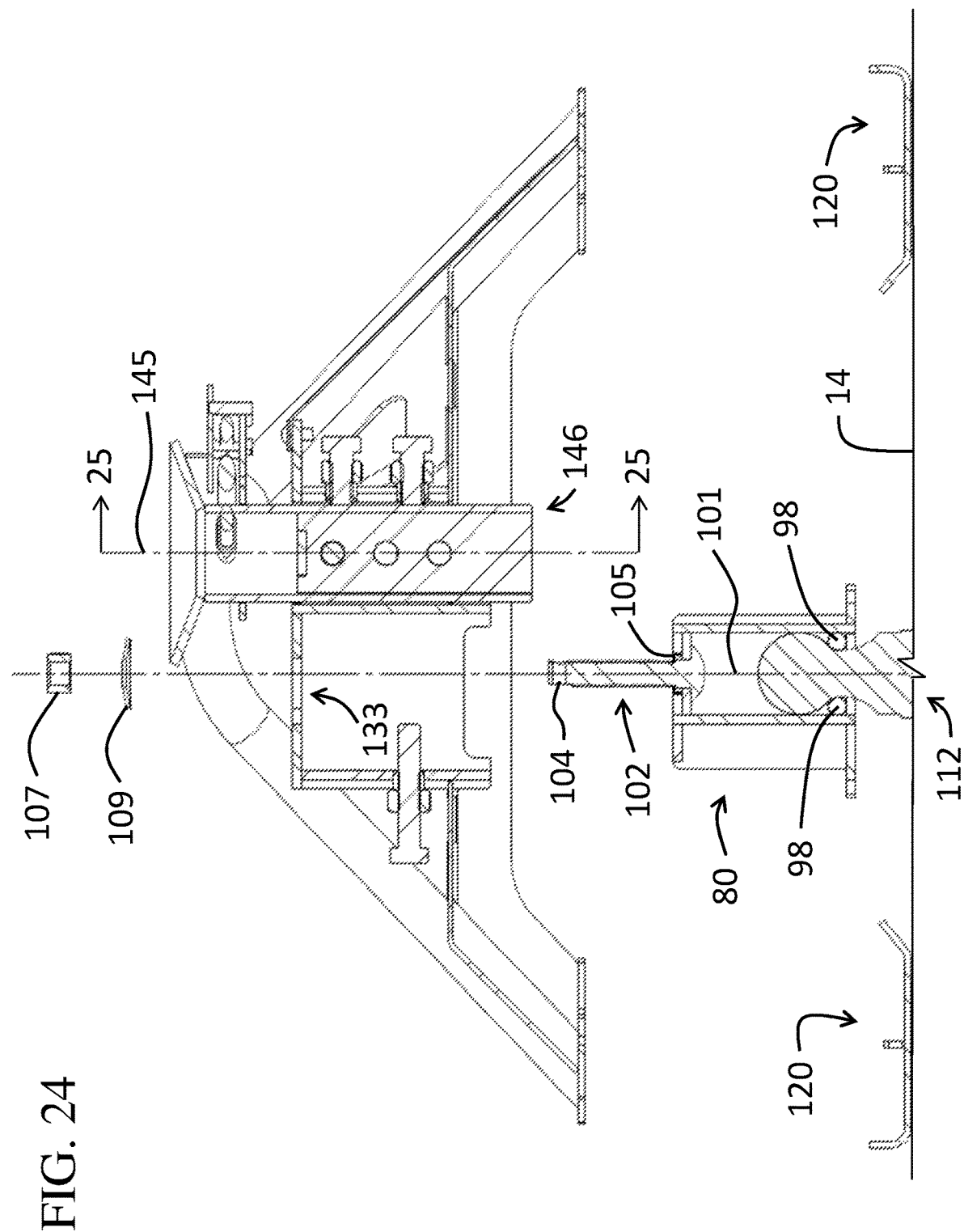
FIG. 24 is a side section view of the single point hitch in FIG. 17.
Figure 25:
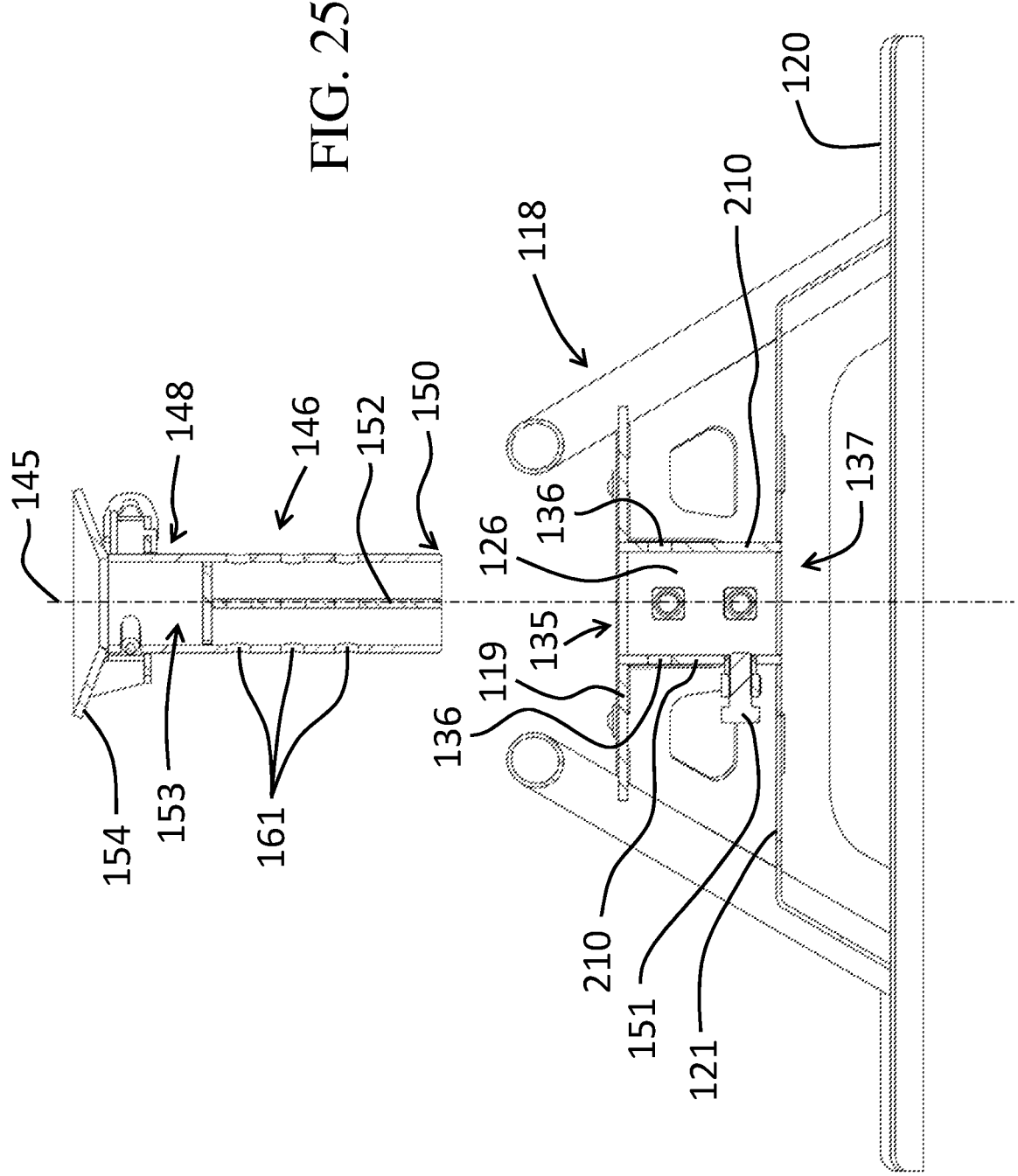
FIG. 25 is a front section view 25-25 of the single point hitch in FIG. 24 through the sleeve axis.

The frame 118 includes a lower planar wall 119 and an upper planar wall 121 where a locking wall 126 is affixed. The locking wall 126 is a vertical wall that extends between the upper and lower planar walls 119, 121, which is best seen in FIG. 16. Also located between the lower and upper planar walls 121, 119 are vertical walls 123. The frame 118 includes bent tubular members 125 where the walls 119, 121, 123 are affixed. The frame further includes foot portions 127 that are affixed to the bent tubular members 125. The foot portions 127 are restrained with respect to the bed supports 120 with a tab 129 extending upwardly from the bed supports 120 through a slot 131 in the foot portions 127. The tab 129 can be any upwardly extending member that protrudes through the slots 131. The tab 129 can be replaced with an upwardly extending bolt or boss that rides in a corresponding slot 131 and restrains movement of the foot portions 127 with respect to their corresponding bed support 120. The foot portions 127 are particularly restrained from lateral movement with respect to the bed supports 120, but longitudinal movement in the longest direction of the slots 131 is possible. When the frame 118 and its foot portions 127 move with respect to the bed supports 120, the tabs 129 ride in their corresponding slots 131 to the extent that the tabs 129 reach the ends of their slots 131. Once a pin (not shown) extends through the tab 129, the foot portion 127 is affixed to the bed support 120 in such a way that the foot portions 127 cannot be lifted off the bed supports 120, yet the foot portions 127 remain able to slide in a longitudinal direction. To further facilitate the sliding motion of the foot portions 127 with respect to the bed, a low friction material such as nylon, Derlin or Teflon may be inserted between the foot portions 127 and bed supports 120. Such low friction inserts are not limited to the examples mentioned. It may also be desirable to use grease or other lubricants to reduce he friction between the foot portions 127 and bed supports 120. In the instances where a high friction coating is used on the bed supports 120 opposite where the foot portions 127 slide, such a high friction coating will encourage sliding of the foot portions 127 with respect to the bed supports 120 as opposed to the bed supports 120 sliding with respect to the bed. Once the hitch 110 is in place, forces will be exerted on the hitch 110 as the towing vehicle accelerates or decelerates. Those forces will cause some sliding of the hitch 110 with respect to the bed supports 120. Thus, the foot portions 127 will slide with respect to bed supports 120. The locking wall 126 also includes threaded holes 132 that are best shown in FIG. 16. The threaded holes 132 include bolts 134 that extend into the locking wall 126. Side walls 210 include a series of transverse holes 136 at various vertical heights that are perpendicular to the threaded holes 132. The side walls 210 may contain a threaded hole that includes a bolt 151 that extends through, as shown in FIG. 25. The locking wall 126, side walls 210, and back wall 214 form the sleeve portion that is affixed to the frame 118. In the embodiment of the invention shown in FIGS. 10-25, the sleeve portion is a rectangular shape, but it could have a circular cross section like the outer sleeve 26 described above. Transverse holes 136 are adapted to receive a pin 138 that extends through the side walls 210. The pin 138 is bent downwardly at one end and cannot be passed through its corresponding hole 136. The opposite end of the pin 138 receives a cotter pin that holds the pin in the transverse holes 136. It is contemplated that the cotter pin could be replaced with an E-clip, snap ring, or other mechanical fastening device. A receiver tube 146 is slidingly and telescopically received in the sleeve portion of the frame 118, particularly through an upper receiver aperture 135 and lower receiver aperture 137 in the upper and lower planar walls, 121 and 119. The receiver tube 146 has an upper end 148 and a lower end 150 and is aligned with a sleeve axis 145. The sleeve axis 145 is shown in FIGS. 23 and 24. The receiver tube 146 is shown as a cylindrical cross section, but it is contemplated that the receiver tube 146 could be a rectangular or other enclosed polygon shape. A support wall 152 is located near the upper end 148 of the receiver tube 146. The support wall 152, shown in FIG. 22, is welded into the receiver tube 146 and is adapted for supporting the weight of the hitch ball 16. The support wall is shown as a vertical wall as shown in FIG. 17, but it is contemplated that the support wall 152 may include a larger bearing surface at its upper end to distribute the weight of the hitch ball 16 received upon it. A receiver pocket 153 is defined by the inner surface of the receiver tube 146, the upper end 148, and the support wall 152. The receiver tube 146 has a funnel 154 located at its upper end 148. The funnel 154 has an upper edge 156 that defines its outer diameter and the funnel 154 has an inner diameter 158 that is concentrically aligned with the receiver tube 146 inner surface that defines the inner diameter of the receiver tube 146. The funnel 154 extends well outwardly of the outer surface of the receiver tube 146. As such, the funnel 154 is overhangs the receiver tube 146. It is contemplated that gussets may be added to support the funnel 154. The funnel 154 is adapted to guide the hitch ball 16 into the receiver tube 146. The receiver tube 146 has a series of transverse holes 161 that are selectively alignable with the holes 136 in the side walls 210. When the holes 161 in the receiver tube 146 are aligned with the holes 36 in the side walls 210, a pin 138 may be inserted through the aligned holes 161, 136 to selectively lock the vertical position of the receiver tube 146 with respect to the frame 118. Once locked into the desired vertical position, the receiver tube 146 can be tightened to the frame 118 using bolts 134, 151 to apply biased pressure and prevent the receiver tube 146 from rattling and prevent any relative movement with respect to the frame 118.

A locking mechanism 162 located on the receiver tube 146. The locking mechanism 162 near the upper end of the receiver tube 146 is adapted to retain the hitch ball 16 within the receiver tube 146. The pin 166 is chordally located with respect to the center of the diameter of the receiver tube 146. In other words, the pin 166 is offset from the center of the receiver tube 146. The side of the pin 166 is adapted to prevent upward movement of the hitch ball 16 from the receiver tube 146 as can be seen in FIGS. 23 and 24. The pin 166 is movable away from the receiver tube 146 so that the pin is retracted from the receiver tube 146, and this corresponds to a second and unlocked position of the pin 166 that allows removal of the hitch ball 16 from the receiver tube 146. The pin 166 may be retracted by a pull rod 168 that is inserted into loop 170 of the pin 166 and pulled away from the receiver tube 146. The pin 166 serves to lock the hitch ball 16 within the receiver tube 146 when the pin 166 is in its locked position.

The hitch 110 as shown in FIGS. 9-25 is held to the bed of the towing vehicle at a single point. That single point of attachment is often a bed-mounted hitch ball 112. This may not always be the case, and although not shown, a shank or other connection that allows some translational movement with respect to the bed may be used. Such a flexible connection allows the relative movement of the hitch 110 and therefore, its foot portions 127 with respect to the bed supports 120 as described above. In the case a gooseneck ball 112 is used as the single point of attachment, a gooseneck ball cage 80 is used to affix the hitch to the hitch ball 112. The gooseneck ball cage 80 has a bottom wall 82, side walls 86, 88, end walls 90, 92, and a top wall 94. The side walls 86, 88 extend beyond end wall 92. The portions of the side walls 86, 88 that extend beyond end wall 92 are offsetting portions 87 and 89 respectively. The bottom wall 82 has a ball aperture 84 that is sized to allow the bed-mounted hitch ball 112 to pass through. On opposite ends of the bottom wall 82 are arcuate notches 85. The side walls 86, 88 have apertures 96 that receive a locking pin 98. The locking pin 98 extends across and through both side walls 86, 88 to capture the hitch ball inside the ball cage 80, as shown in FIG. 16. The locking pin 98, when extending through the side walls 86, 88 overlays a part of the ball aperture that is offset from the center of the ball aperture 84. The end walls 90, 92 and side walls 86, 88 are spaced apart enough to allow the hitch ball 112 to be located between them. The spacing of the end walls 90, 92 and side walls 86, 88 define an approximately square chamber 93 for receiving the ball 112 above the ball aperture 84. The chamber 93 circumscribes the ball 112. The top wall 94 has an aperture 100 that receives a threaded fastener 102. In the embodiment shown herein, the threaded fastener 102 is a carriage bolt, but other types of fasteners are contemplated. Instead of a carriage bolt, it is contemplated a captured nut or threaded hole is located where the threaded fastener 102 extends from the top wall 94. It may also be the case that the threaded fastener 102 is welded to the top wall 94. The threaded fastener 102 has a locking aperture 104 extending through it that is spaced from the top wall 94 and the threaded fastener is retained to the top wall 94 in the ball cage 80 with a clip 105. The threaded fastener 102 is aligned with the ball aperture 84 to form a cage axis 101. The cage axis 101 is the centerline of the chamber 93 that circumscribes the ball 112. Thus the cage axis 101 is also the centerline of the ball 112 when the ball cage 80 contains the ball within its chamber 93. The cage axis 101 is shown in FIGS. 23 and 24. The chamber 93 for receiving the ball 112 is not centered with respect between opposite ends of the bottom wall 82, nor is the chamber 93 centered with respect to the notches 85 in the bottom wall. The chamber 93 and cage axis 101 is biased to be nearer a first end 95 of the ball cage 80 than a second end 97 of the ball cage 80. The offset biased location of the chamber 93 can be seen in FIGS. 19 and 20 which show that the offsetting portions 87, 89 act to space the chamber 93 farther from the right end of the bottom wall 82 as viewed in FIG. 21.

Figure 15:
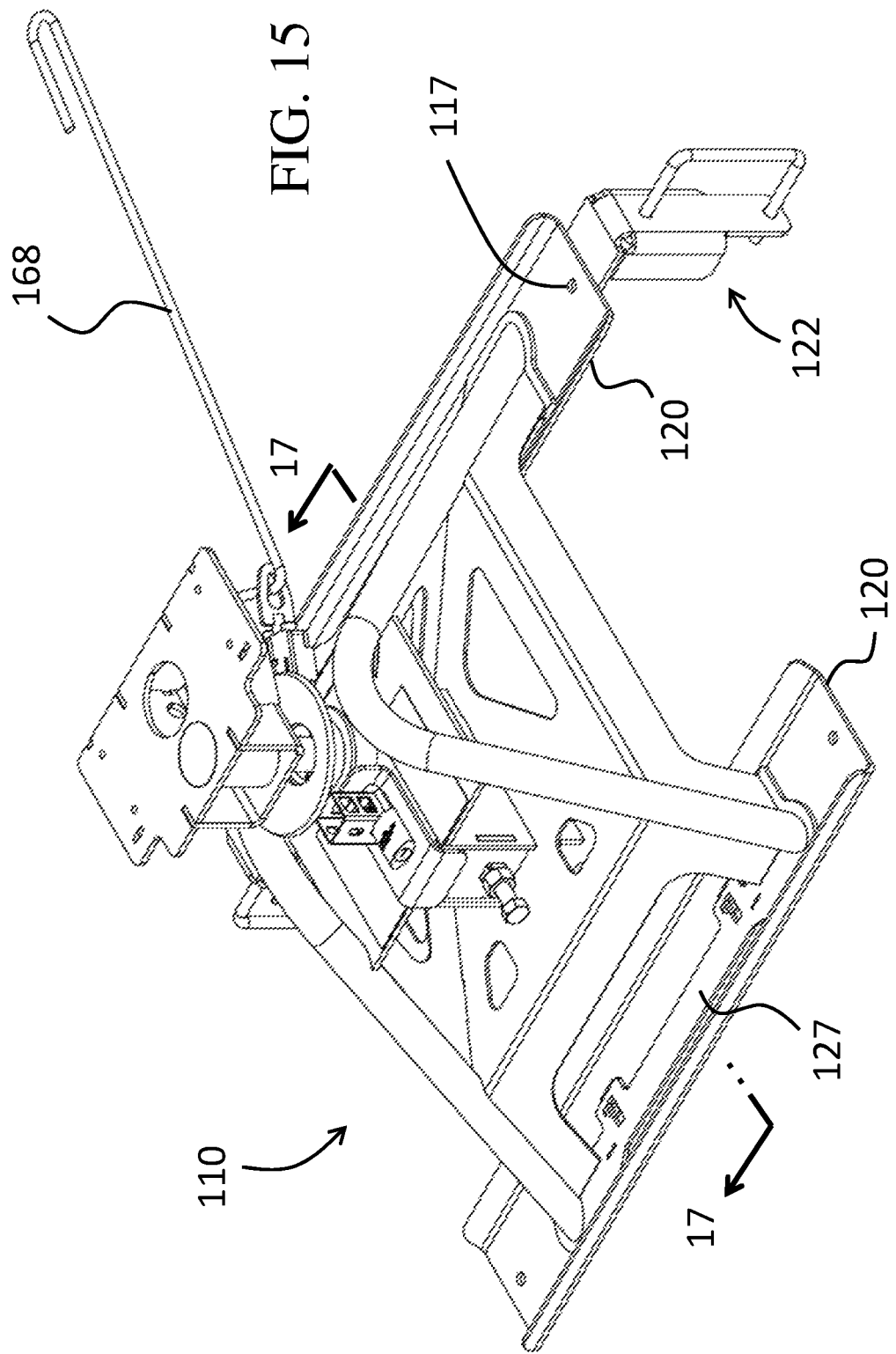
FIG. 15 is an isometric view of the single point hitch with the locking mechanism installed.
Figure 16:
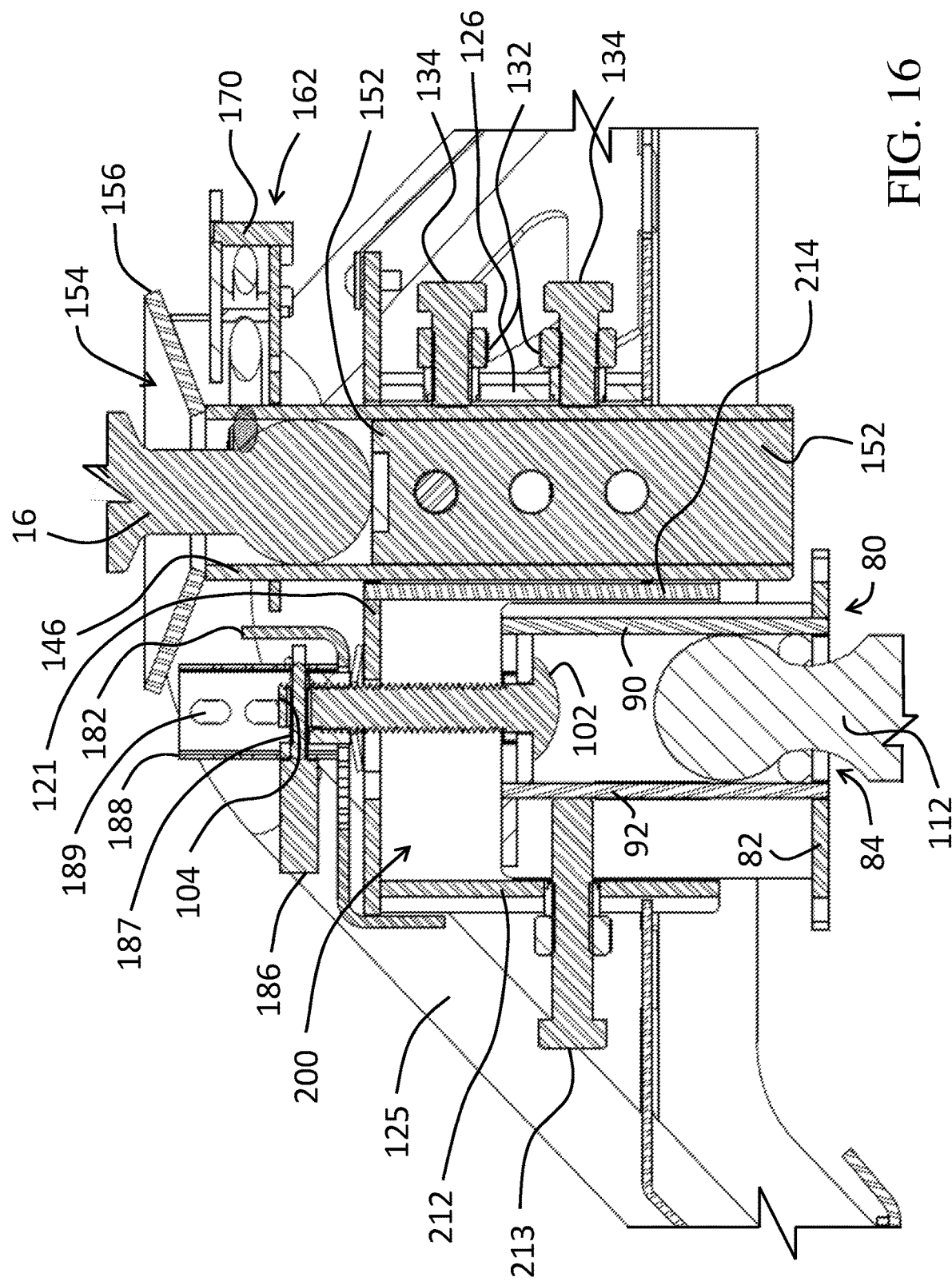
FIG. 16 is a partial side section view 16 of the single point hitch shown in FIG. 14.
Figure 17:
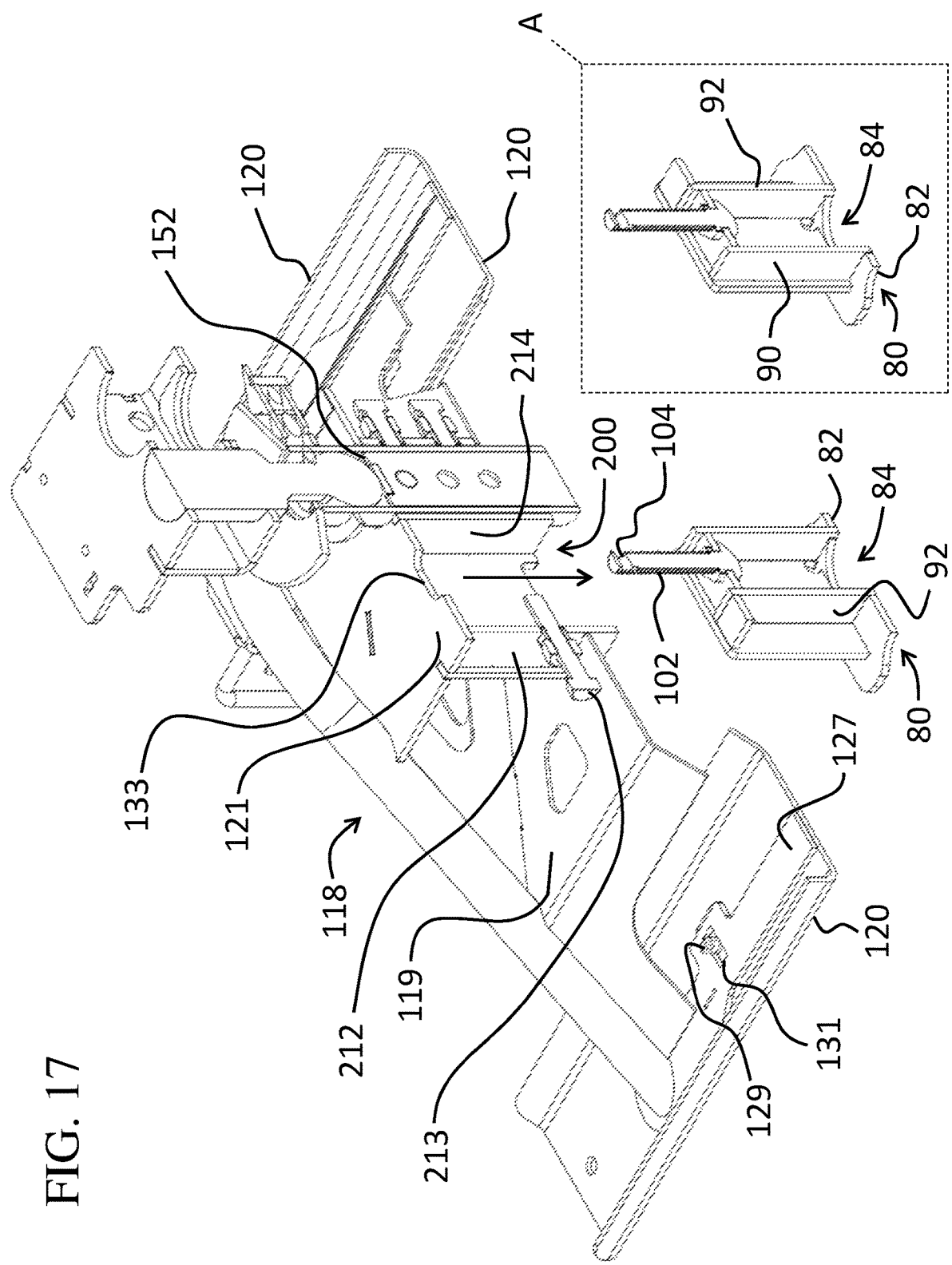
FIG. 17 is an isometric section view 17-17 of the single point hitch shown in FIG. 15 before assembly to the ball cage, partial view A is an isometric section view of the ball cage 80 in an alternate orientation.

The frame 118 has a cage pocket 200 affixed thereto, shown in section views FIG. 15-16 and adjacent the receiver tube 146 and sleeve portion. The cage pocket 200 has a front wall 212, the back wall 214, and shares the same side walls 210 as described in the sleeve portion. The front wall 212 includes a biasing bolt 213 that can impinge on a portion of the ball cage 80, particularly end walls 90 or 92. It is contemplated that the side walls 210 do not extend between the cage pocket 200 and the sleeve portion. The top of the cage pocket 200 is defined by the upper planar wall 121. The cage pocket 200 receives the ball cage 80 to affix the hitch 110 to the towing vehicle 14. Because of the shape of the cage pocket 200 and ball cage 80, the cage pocket 200 can receive the ball cage in two different orientations. A far orientation is shown in FIG. 23 and a close orientation is shown in FIG. 24. The far orientation is denoted by the distance between the cage axis 101 and the sleeve axis 145 being larger than the distance between the cage axis 101 and the sleeve axis 145 shown in FIG. 24, which represents the close orientation. This shift of the ball cage 80 between its close orientation and far orientation shifts the entire hitch 110 with respect to the ball 112. Because the ball 112 location is fixed within the bed, this shifts the entire hitch 110 with respect to the cab. The far orientation locates the entire hitch 110 relatively far from the cab and the close orientation locates the entire hitch relatively near to the cab. The shift in relative location with respect to the cab is simply accomplished by merely rotating the ball cage 180 degrees to achieve the desired orientation that will accommodate the trailer that is intended to be towed. Regardless of the orientation, the threaded fastener 102 can pass through an elongate aperture 133 in the upper planar wall 121 to allow a nut 107 to be threaded onto the fastener 102. The elongate aperture 133 is long enough to accommodate the relative positional shift of the threaded fastener 102 with respect to the elongate aperture 133. When the ball cage 80 is in its far orientation, the threaded fastener 102 is near the left end of the elongate aperture 133 as shown in FIG. 23. When the ball cage 80 is in its close orientation, the threaded fastener 102 is near the right end of the elongate aperture 133 as shown in FIG. 24. A conical washer 109 held between the tightened nut 107 and upper planar wall 121 provides a biasing force once the hitch 110 is assembled to the towing vehicle. The conical washer 109 flattens out as the nut 107 is tightened and is resilient to maintain a certain amount of axial force on the threaded fastener 102. A nut 107 is described herein, but it is contemplated that other methods or devices can be used to draw the ball cage 80 into the cage pocket 200 to affix the ball cage 80 to the frame 118. In the event that the aperture 100 in the top wall 94 of the ball cage 80 is threaded, a bolt could be used to draw the ball cage 80 into the cage pocket 200.

Figure 14:
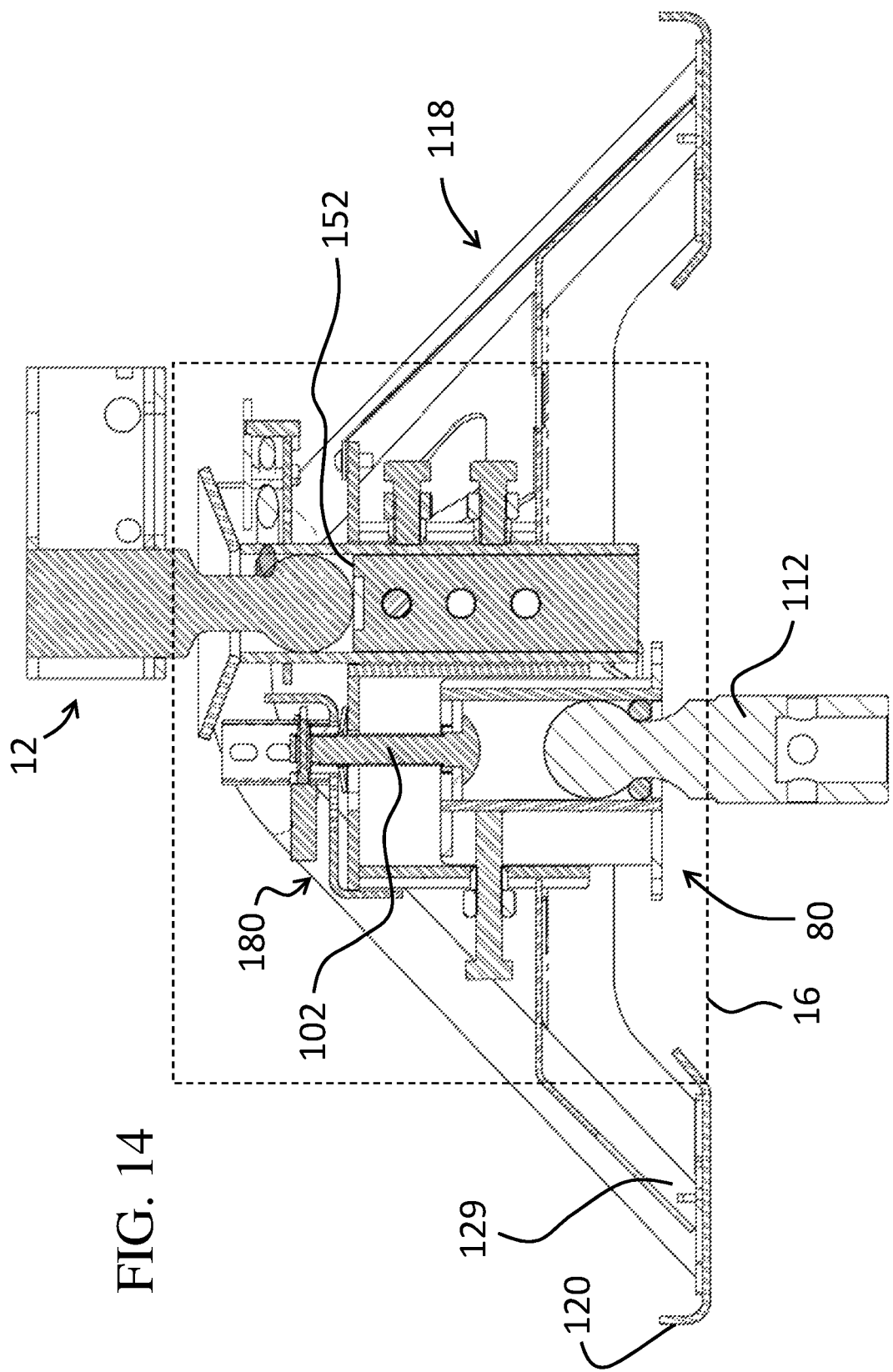
FIG. 14 is a side section view 14-14 of the single point hitch shown in FIG. 13.
Figure 19:
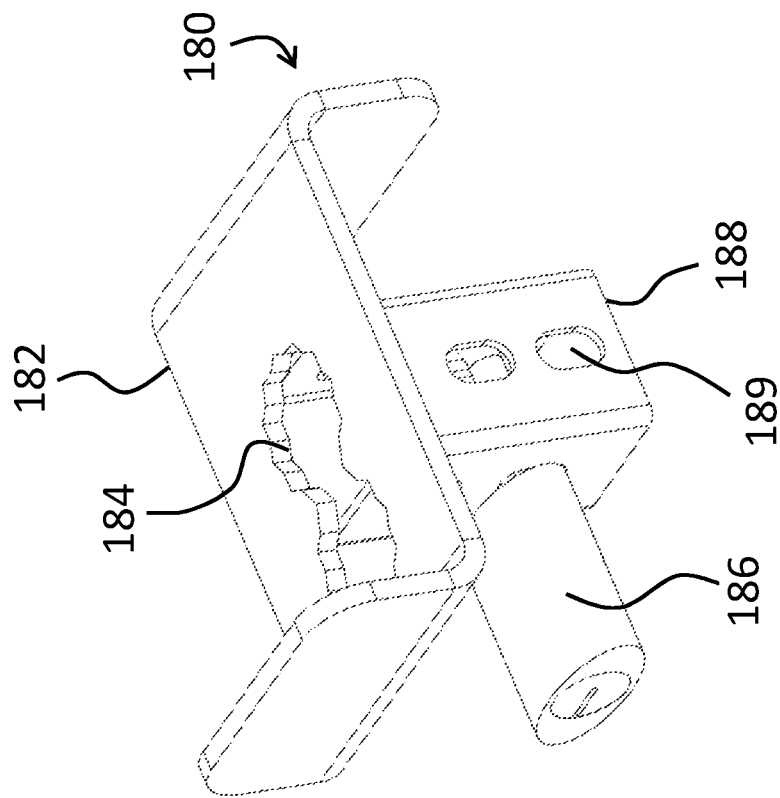
FIG. 19 is a bottom isometric view of the lock in FIG. 18.
Figure 18:
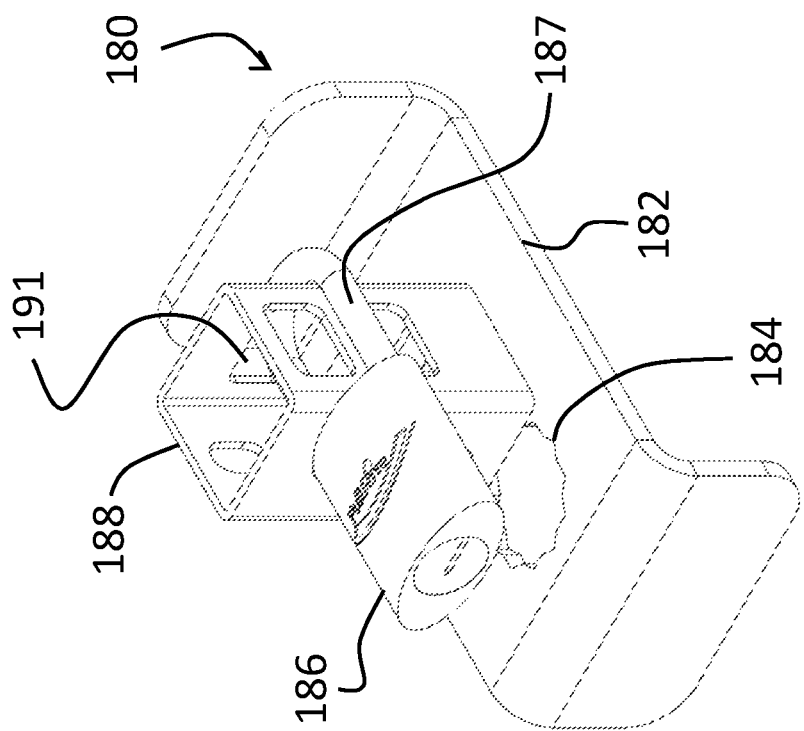
FIG. 18 is a top isometric view of a lock.
Figure 20:
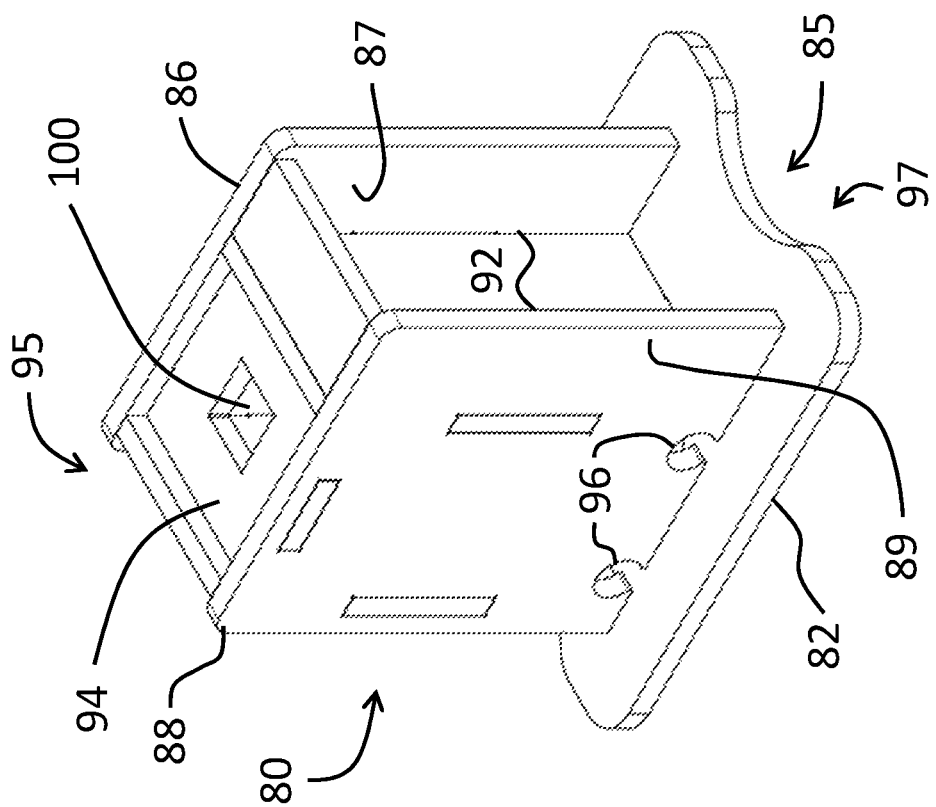
FIG. 20 is an isometric view of the reversible ball cage.
Figure 21:
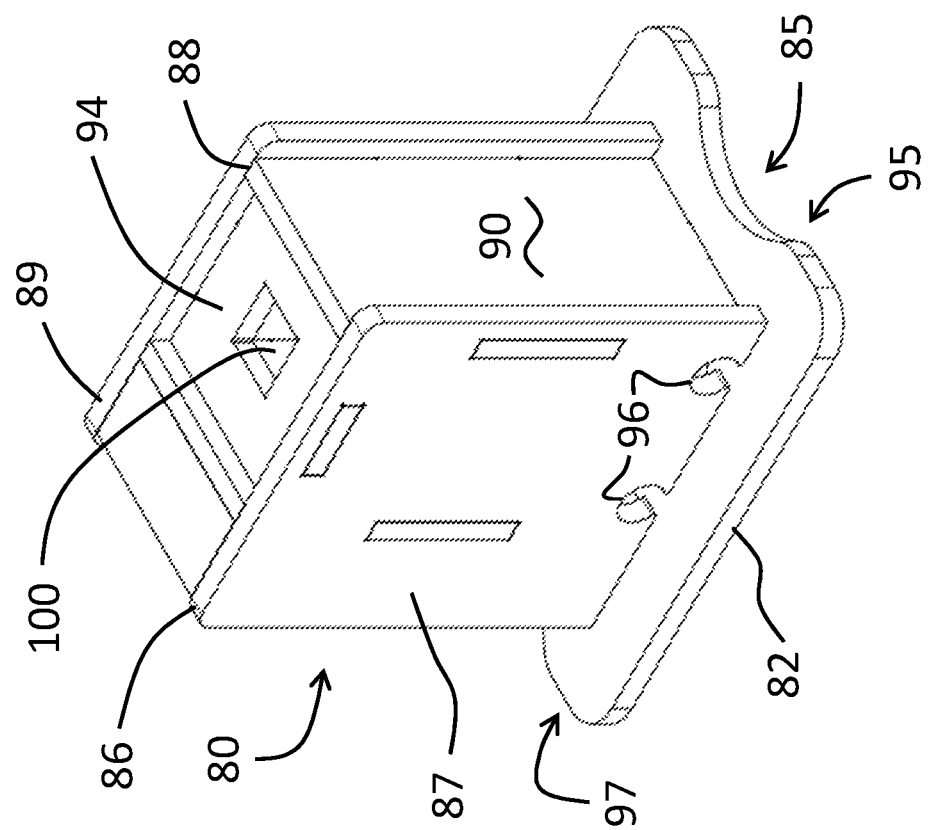
FIG. 21 is an isometric view of the reversible ball cage in the orientation shown in partial view A in FIG. 17.

A cage lock 180 is shown installed in FIG. 14 and standalone in FIGS. 18 and 19. The cage lock 180 has a nut retaining plate 182 with a nut locking aperture 184. The nut locking aperture 184 has an interior shape that prevents the nut 107 from rotating when the nut 107 is located therein. For example, the interior shape of the locking aperture 184 may be of a similar shape to a twelve point socket or similar variant that fits the nut 107 in a complementary fashion. As shown, the aperture 184 allows the close or far ball cage 80 installation orientation, shown in FIG. 23 (far) and FIG. 24 (close). FIG. 14 shows the ball cage 80 and cage lock 180 affixed in the far orientation. In either orientation, the notch 85 provides clearance for the lower end 150 of the receiver tube 146. The cage lock 180 includes a padlock 186 having a shackle 187 that extends through tube apertures 189, 191 in a tube 188 and the locking aperture 104 in the threaded fastener 102 to prevent the hitch 110 from being removed. In addition to preventing the hitch 110 from being removed, the shackle 187 blocks the nut 107 from traveling along the threaded fastener 102 in the unlikely event that it would rattle loose. The tube apertures may be small apertures 189 or large apertures 191. The large apertures 191 allow increased room to install the lock 186.

To install the hitch 110 to the towing vehicle 14, the user first installs the vehicle-mounted ball 112. The user next locates the ball cage 80 over the ball 112 by passing the ball 112 through the ball aperture 84 and installing pins 98 through apertures 96. The ball cage 80 is installed in either the far or the close orientation. If the user wants the receiver and pivot point of the trailer to be relatively near the cab of the towing vehicle, he will use the near orientation. If the user wants to have the receiver and pivot point of the trailer to be relatively far from the cab of the towing vehicle, he will rotate the ball cage 80 one hundred eighty degrees from its near orientation so that the ball cage 80 is in its far orientation. The user may then locate the bed supports 120 on the towing vehicle 14. The user then lowers the frame 118 and aligns the threaded fastener 102 with the elongate aperture 133. The nut 107 is tightened to draw the ball cage 80 upward, and because it is attached to the vehicle-mounted ball 112, the frame 118 is drawn down to the towing vehicle 14. Once the nut 107 is sufficiently tight, the user may tighten the biasing bolt 213 to further secure the ball cage 80 into the ball pocket 200. The user may also install pins to secure the tabs 129 of the bed supports 120 to the foot portions 127 of the frame 118. At that point, the optional lock 180 may be installed. The user may have to rotate the nut 107 slightly to align the aperture 184 and allow the nut retaining plate 182 to surround the nut 107. The lock 186 may then be installed through the tube 188 and the aperture 104 in the threaded fastener 102.

Figure 26:
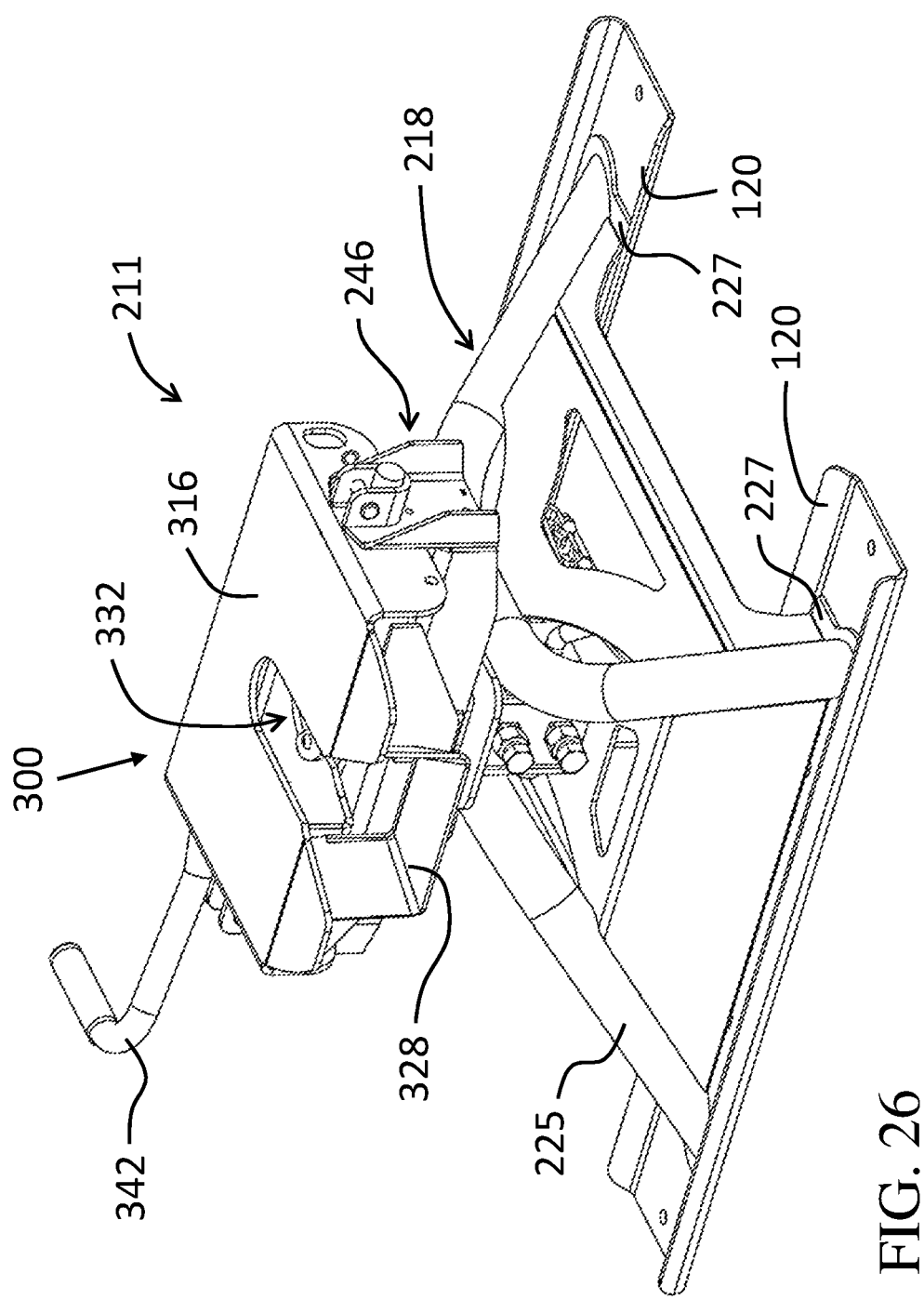
FIG. 26 is a top isometric view of the hitch with a skid plate attached.
Figure 27:
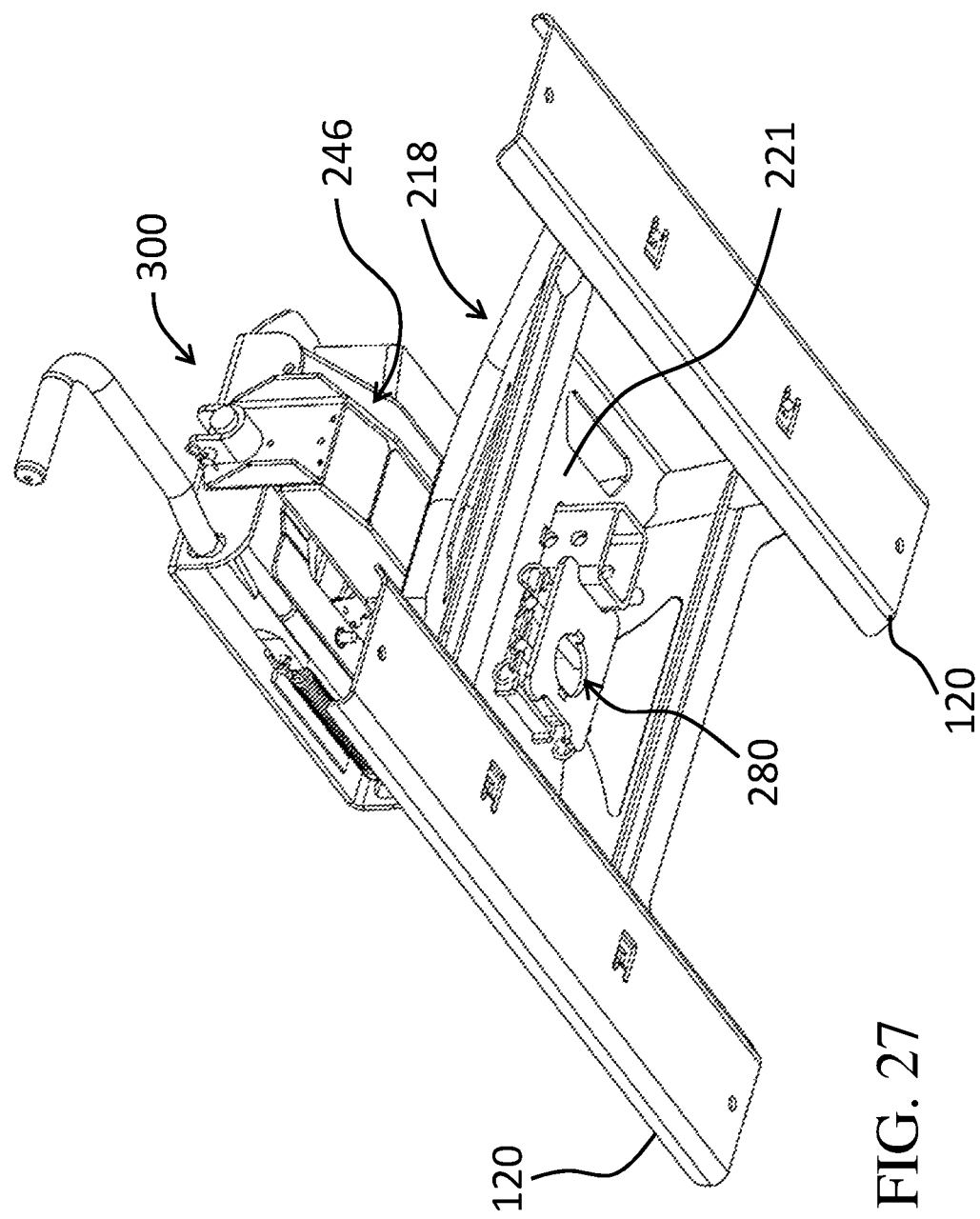
FIG. 27 is a bottom isometric view of the hitch in FIG. 26.

A single point adaptation of the hitch 211, shown in FIGS. 26-37, has the capability to affix to a bed-mounted hitch ball which is affixed to a towing vehicle 14 and receive a trailer having a kingpin without the need for any additional adapters or components attached to the kingpin. The hitch 211 is shown in FIG. 26 with a plate assembly 300 that connects to a rocker assembly 246. As previously described, the bed supports 120 rest on the bed surface of the vehicle 14 and are held in place when the hitch 211 is attached to the vehicle 14. Generally, the bed supports 120 do not slide with respect to the bed surface of the towing vehicle 14. Many uses of the hitch 211 will have bed supports 120 that contact the surface of the bed and do not need any further connection to the bed other than resting upon the bed. In some cases it may be desirable to put a high friction coating on the lower surfaces of the bed supports 120 where they contact the bed. The bed supports 120 spread load placed on the hitch 211 and prevent damage to the bed.

A frame 218 is formed from structural components that are welded, riveted, bolted, or otherwise fastened together. The frame 218 shares many features with frame 18 and includes additional components similar to frame 118. The fifth wheel hitch 211 is used with the rocker assembly 246 and plate assembly 300 to connect the kingpin of a trailer to the towing vehicle 14. The hitch 211 provides multiple degrees of freedom for rotation through the rocker assembly 246 and connection between the plate assembly 300 to the rocker assembly 246.

Figure 31:
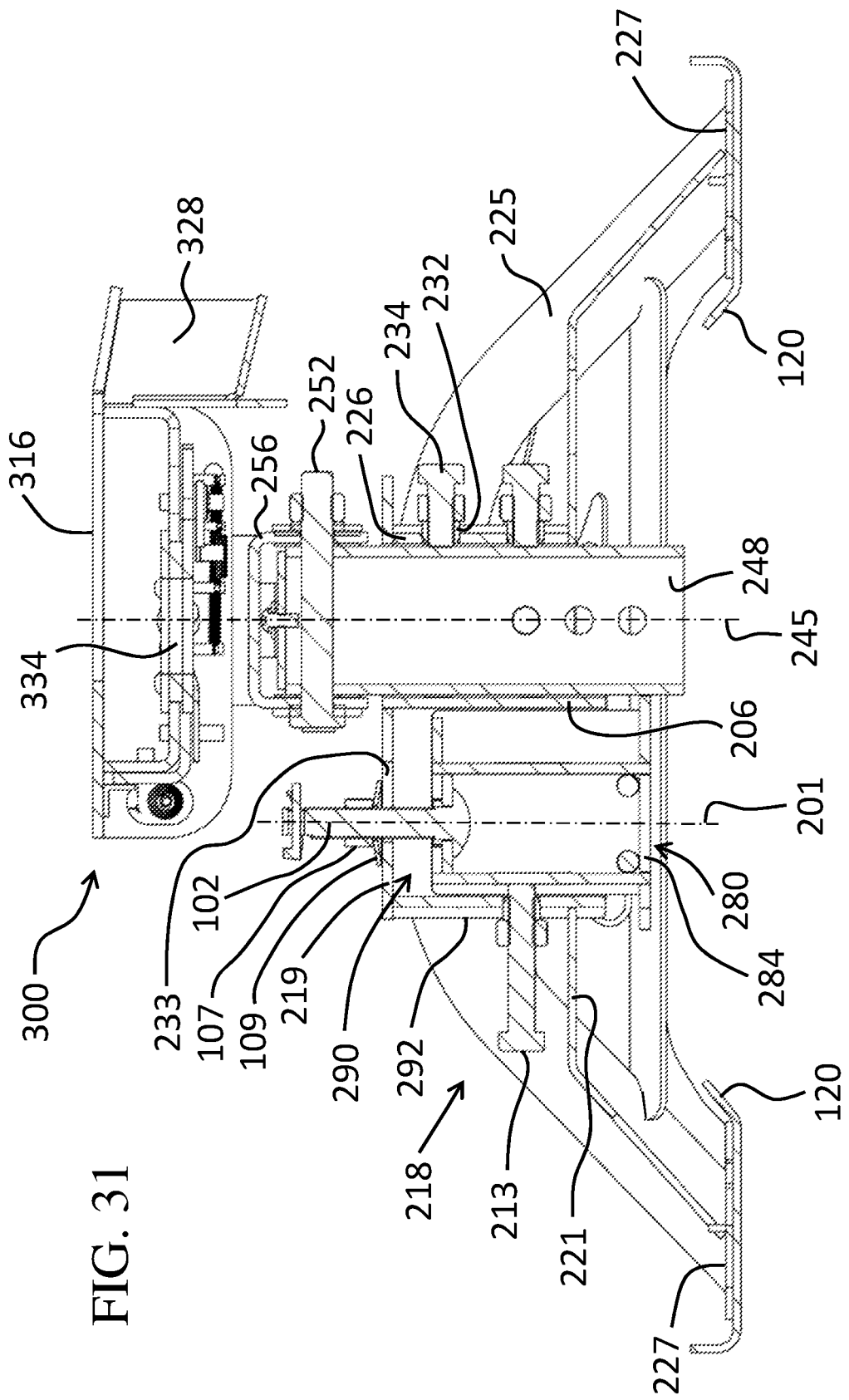
FIG. 31 is a section view 31-31 of the hitch in FIG. 30.
Figure 32:
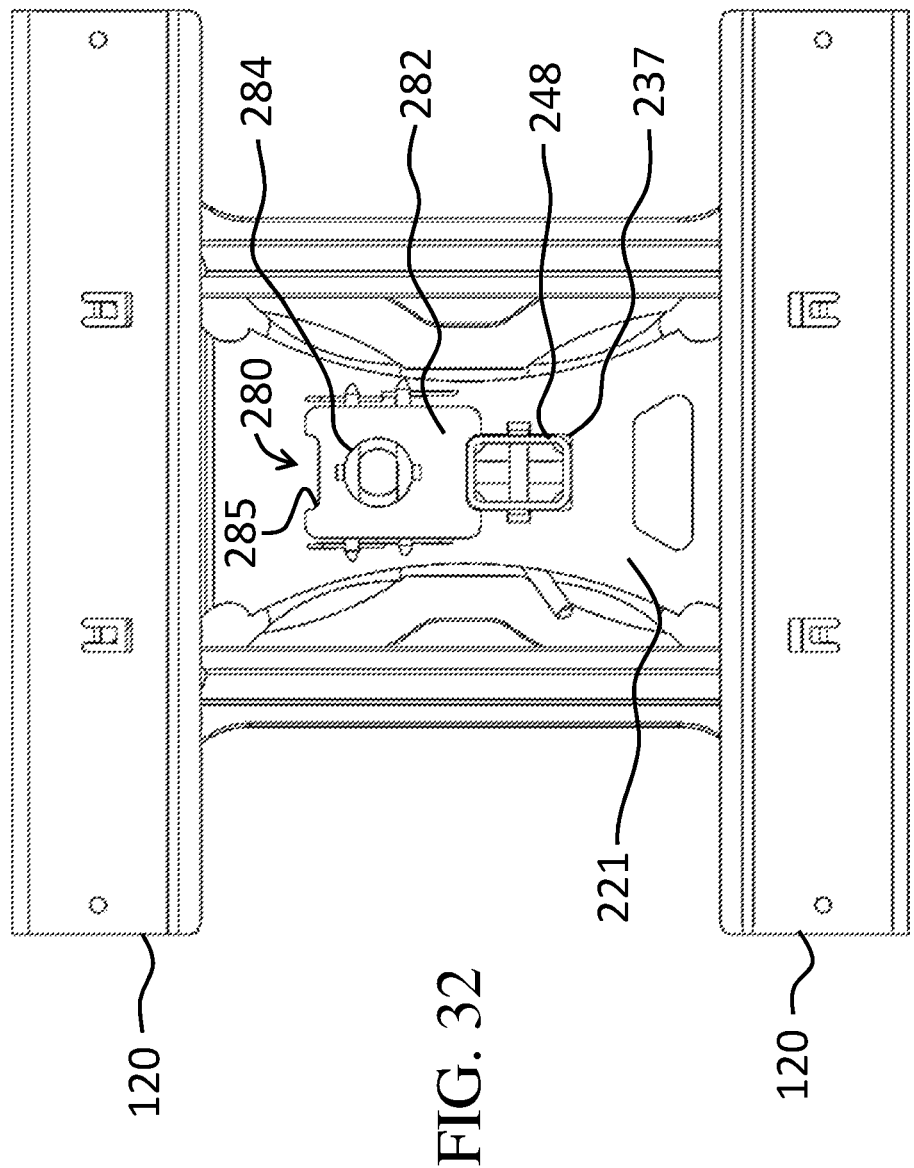
FIG. 32 is a bottom view of the hitch in FIG. 26.
Figure 33:
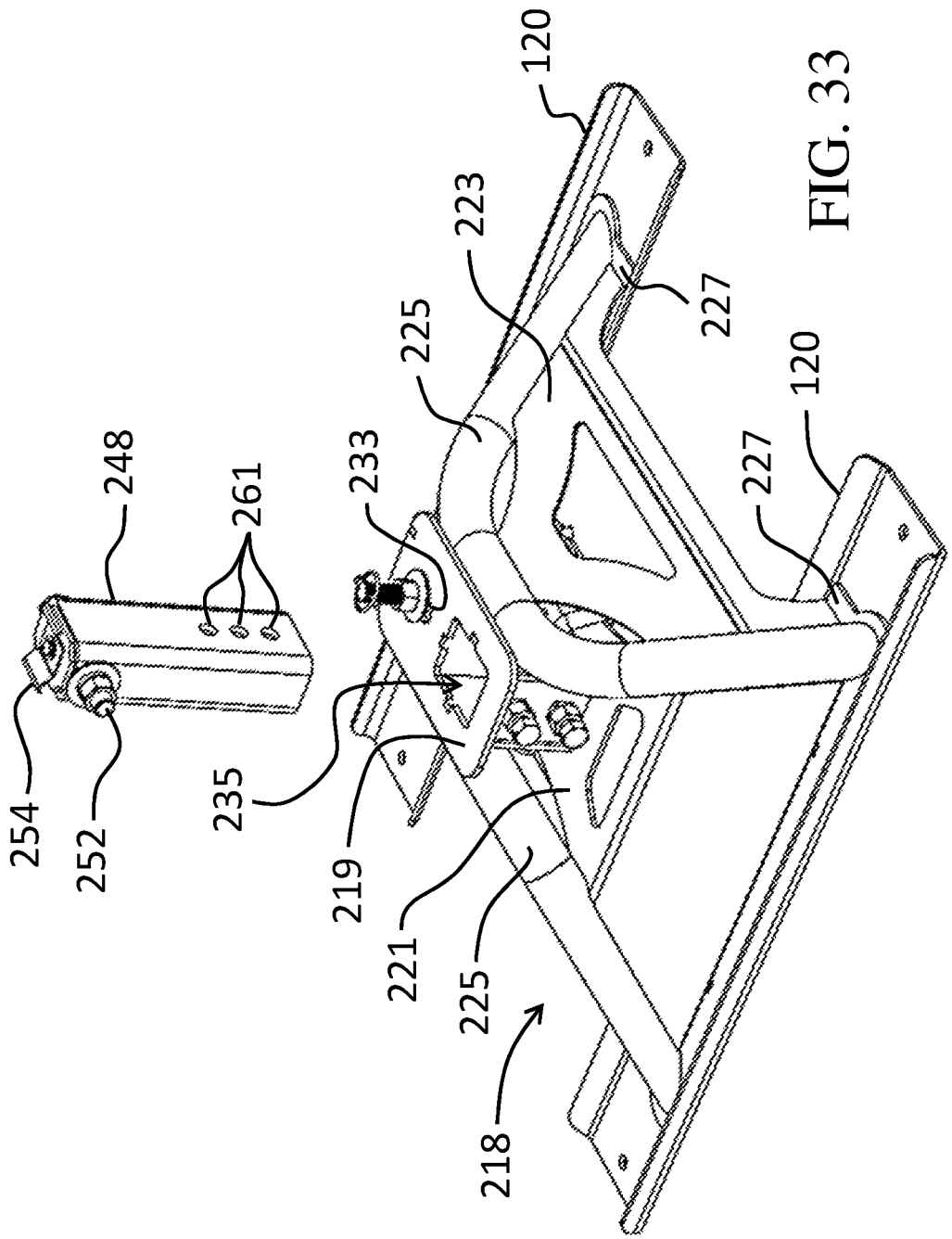
FIG. 33 is a top isometric view of the frame and tube.
Figure 34:
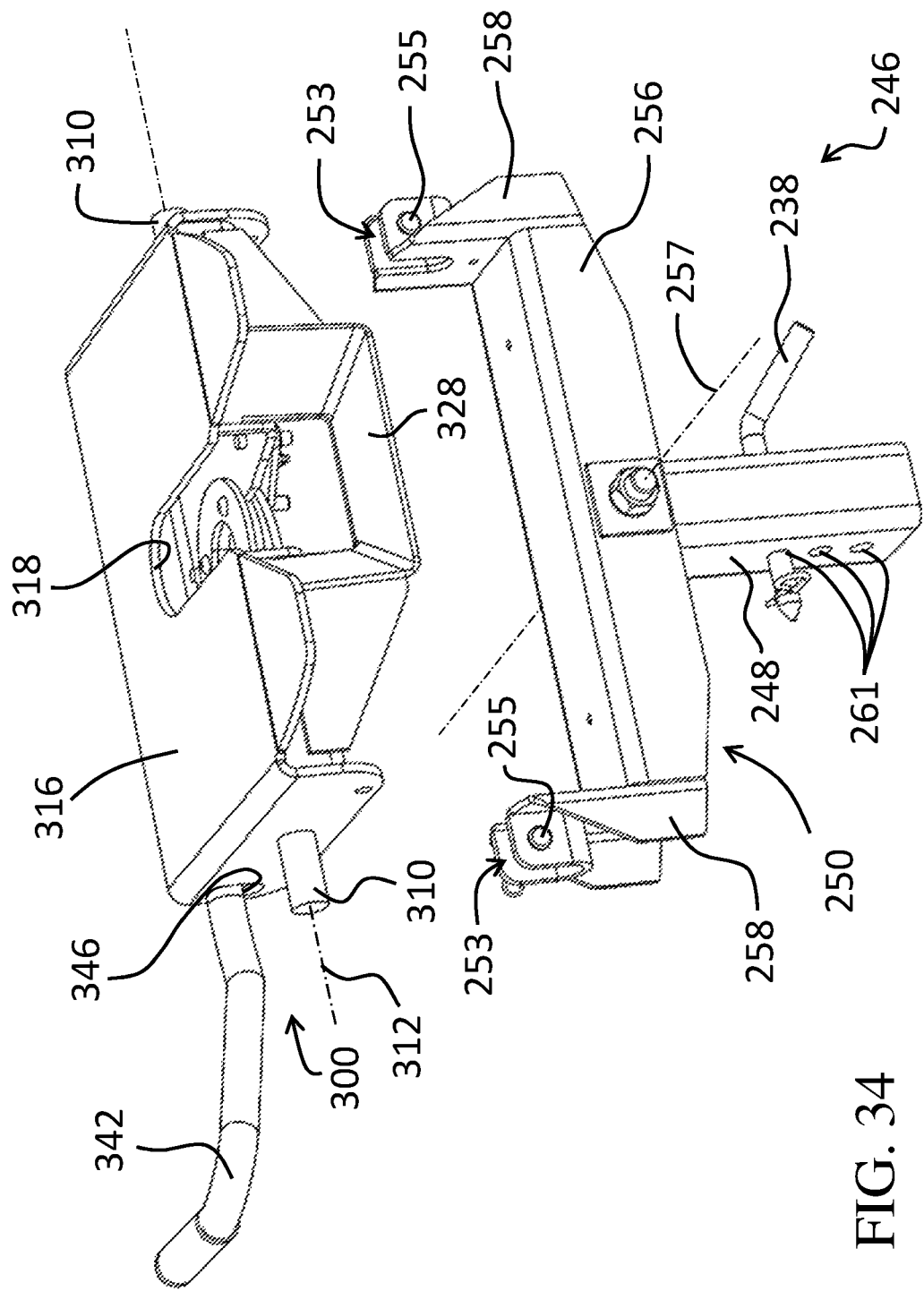
FIG. 34 is an isometric partially disassembled view of the plate and rocker assembly.
Figure 35:
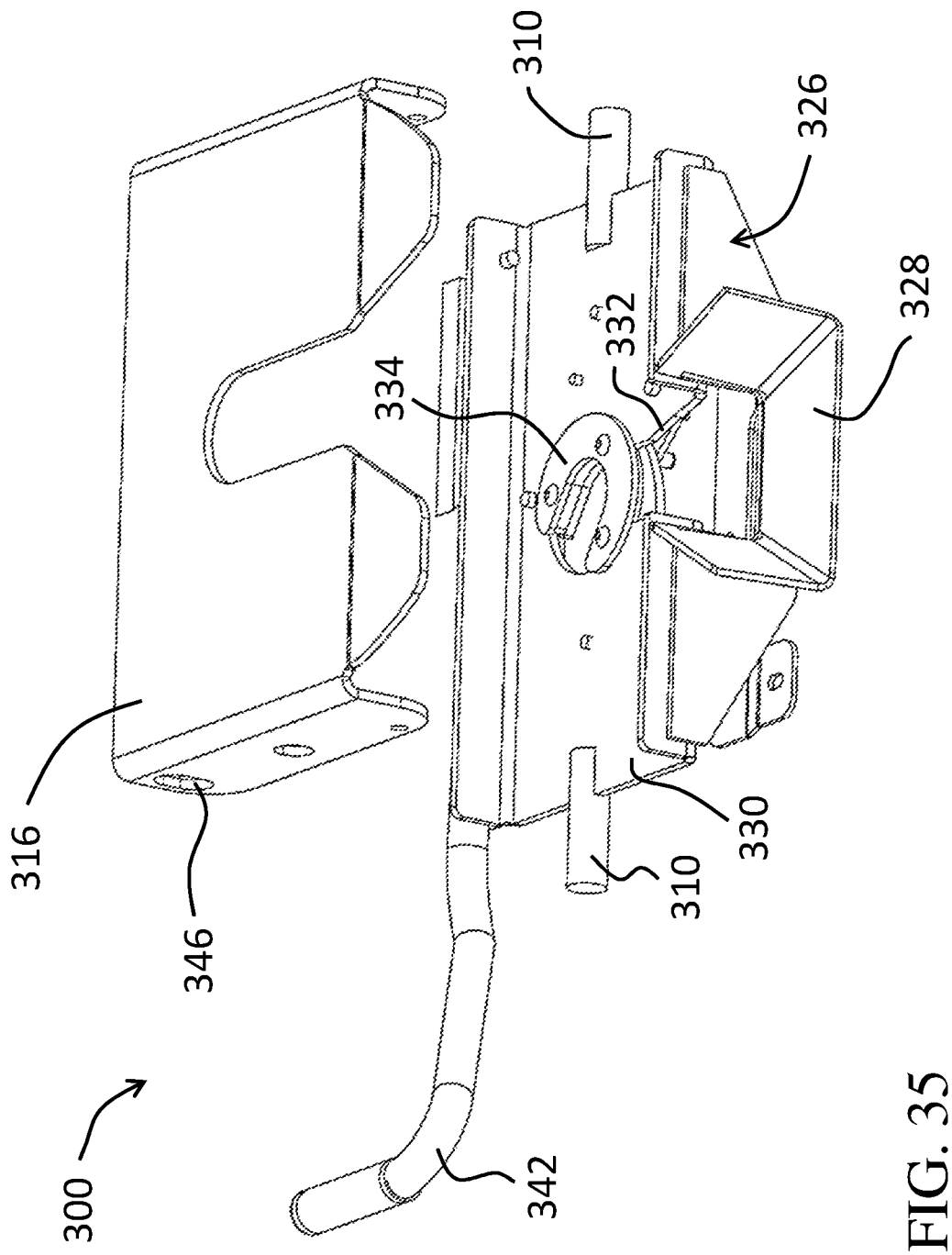
FIG. 35 is an exploded isometric top view of the plate assembly.
Figure 36:
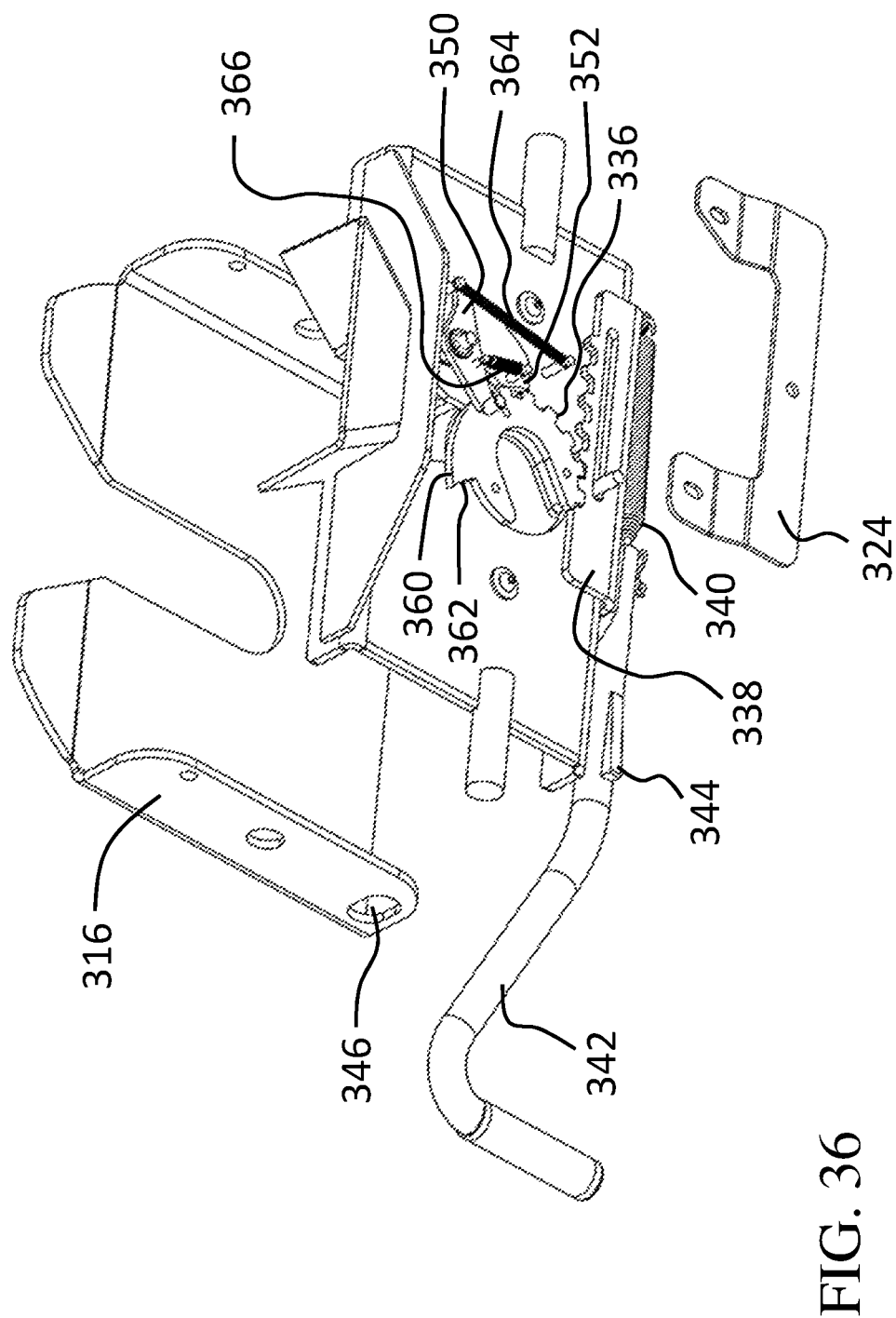
FIG. 36 is a bottom isometric view of the plate assembly in FIG. 35.

The frame 218 includes an upper planar wall 219 and a lower planar wall 221 where a locking wall 226 is affixed. The locking wall 226 is a vertical wall that extends between the upper and lower planar walls 219, 221, which is best seen in FIG. 31. Also located adjacent the lower and upper planar walls 221, 219 are vertical walls 223. The frame 218 includes bent tubular members 225 where the walls 223 are affixed. The frame 218 further includes foot portions 227 that are affixed to the bent tubular members 225. The bed supports 120 are restrained with respect to the foot portions 227 with a tab 129 extending upwardly from the bed supports 120 through a slot in the foot portions 227. The tab 129 can be any upwardly extending member that protrudes through the slots. The tab 129 can be replaced with an upwardly extending bolt or boss that rides in a corresponding slot 131 and restrains movement of the foot portions 127 with respect to their corresponding bed support 120. The locking wall 226 also includes threaded holes 232 that are best shown in FIG. 31. The threaded holes 232 include bolts 234 that extend into the locking wall 226. Side walls 208 include a transverse hole 236 that is perpendicular to the threaded holes 232. The locking wall 226, side walls 208, and back wall 206 form the sleeve portion that is affixed to the frame 218. In the embodiment of the invention shown in FIGS. 26-37, the sleeve portion has a sleeve axis 245 and is a rectangular shape, but it could have a circular cross section like the outer sleeve 26 described above. Transverse hole 236 is adapted to receive a pin 238 that extends through the side walls 208. The pin 238 is bent downwardly at one end and cannot be passed through its corresponding hole 236. The opposite end of the pin 238 receives a cotter pin that holds the pin in the transverse holes 236. It is contemplated that the cotter pin could be replaced with an E-clip, snap ring, or other mechanical fastening device.

Figure 28:
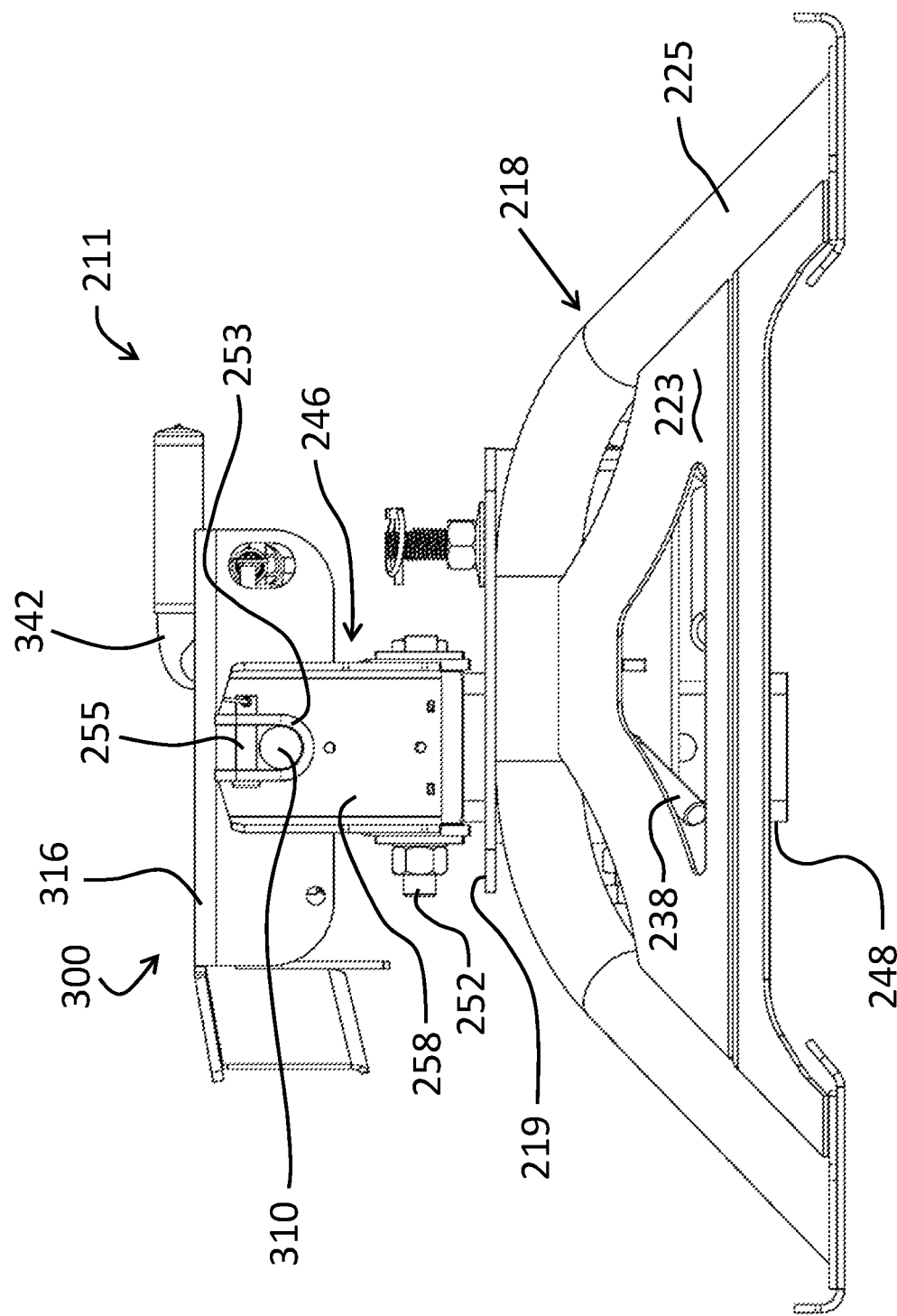
FIG. 28 is a side view of the hitch in FIG. 26.

A rocker assembly 246 is slidingly and telescopically received in the sleeve portion of the frame 218, particularly through an upper receiver aperture 235 and lower receiver aperture 237 in the upper and lower planar walls, 221 and 219. The rocker assembly 246 has a tube 248 and a cradle 250. The tube 248 is shown as a rectangular cross section, but it is contemplated that the tube 248 could be a cylinder, square, or other enclosed polygon shape. The tube 248 is attached to the cradle 250 through a fastener 252. The cradle 250 can pivot about the fastener 252 and cradle axis 257 within a limited range. A spring 254 biases the cradle 250 to be perpendicularly oriented with respect to the tube 248. The cradle 250 is an elongate member 256 with upstanding walls 258, each having a corresponding pocket 253. It is contemplated that gussets may be added to support the upstanding walls 258 and pockets 253. The pockets 253 are adapted to receive and retain the plate assembly 300 as shown in FIG. 28. The tube 248 has a series of transverse holes 261 that are selectively alignable with the holes 236 in the side walls 208. When the holes 261 in the tube 248 are aligned with the holes 236 in the side walls 208, the pin 238 may be inserted through the aligned holes 261, 236 to selectively lock the vertical position of the rocker assembly 246 with respect to the frame 218. Once locked into the desired vertical position, the tube 248 can be tightened to the frame 218 using bolts 234 to apply biased pressure and prevent the tube 248 from rattling and prevent any relative movement with respect to the frame 218.

The hitch 211, as shown in FIGS. 26-39, is held to the bed of the towing vehicle at a single point, the same attachment as the hitch shown in FIG. 23. That single point of attachment is often a bed-mounted hitch ball 112. In the case the bed-mounted hitch ball 112 is used as the single point of attachment, a gooseneck ball cage 280 is used to affix the hitch to the hitch ball 112. The ball cage 280 is similar to ball cage 80 with a few differences described below. The bottom wall 282 has a notch 285 which has a different shape than the arcuate notch 85. The bottom wall, side walls, end walls, and top wall are identical. It has a cage axis 201 that extends through the center of the ball aperture 284.

The frame 218 has a cage pocket 290 affixed thereto, shown in section view FIG. 31, and adjacent the tube 248. The cage pocket 290 has a front wall 292, the back wall 206, and shares the same side walls 210 as described in the sleeve portion. The front wall 292 includes a biasing bolt 213 that can impinge on a portion of the ball cage 280, particularly end walls 90 or 92. It is contemplated that the side walls 208 do not extend between the cage pocket 290 and the sleeve portion. The top of the cage pocket 290 is defined by the upper planar wall 121. The cage pocket 290 receives the ball cage 280 to affix the hitch 110 to the towing vehicle 14. Because of the shape of the cage pocket 290 and ball cage 280, the cage pocket 290 can receive the ball cage 280 in two different orientations. A far orientation is shown in FIG. 23 and a close orientation is shown in FIG. 24. The shift in relative location with respect to the cab is simply accomplished by merely rotating the ball cage 180 degrees to achieve the desired orientation that will accommodate the trailer that is intended to be towed. Regardless of the orientation, the threaded fastener 102 can pass through an elongate aperture 233 in the upper planar wall 219 to allow a nut 107 to be threaded onto the fastener 102. The elongate aperture 233 is long enough to accommodate the relative positional shift of the threaded fastener 102 with respect to the elongate aperture 233. A conical washer 109 held between the tightened nut 107 and upper planar wall 219 provides a biasing force once the hitch 211 is assembled to the towing vehicle. To install the hitch 211 to the towing vehicle 14, the process is the same as hitch 110.

Figure 29:
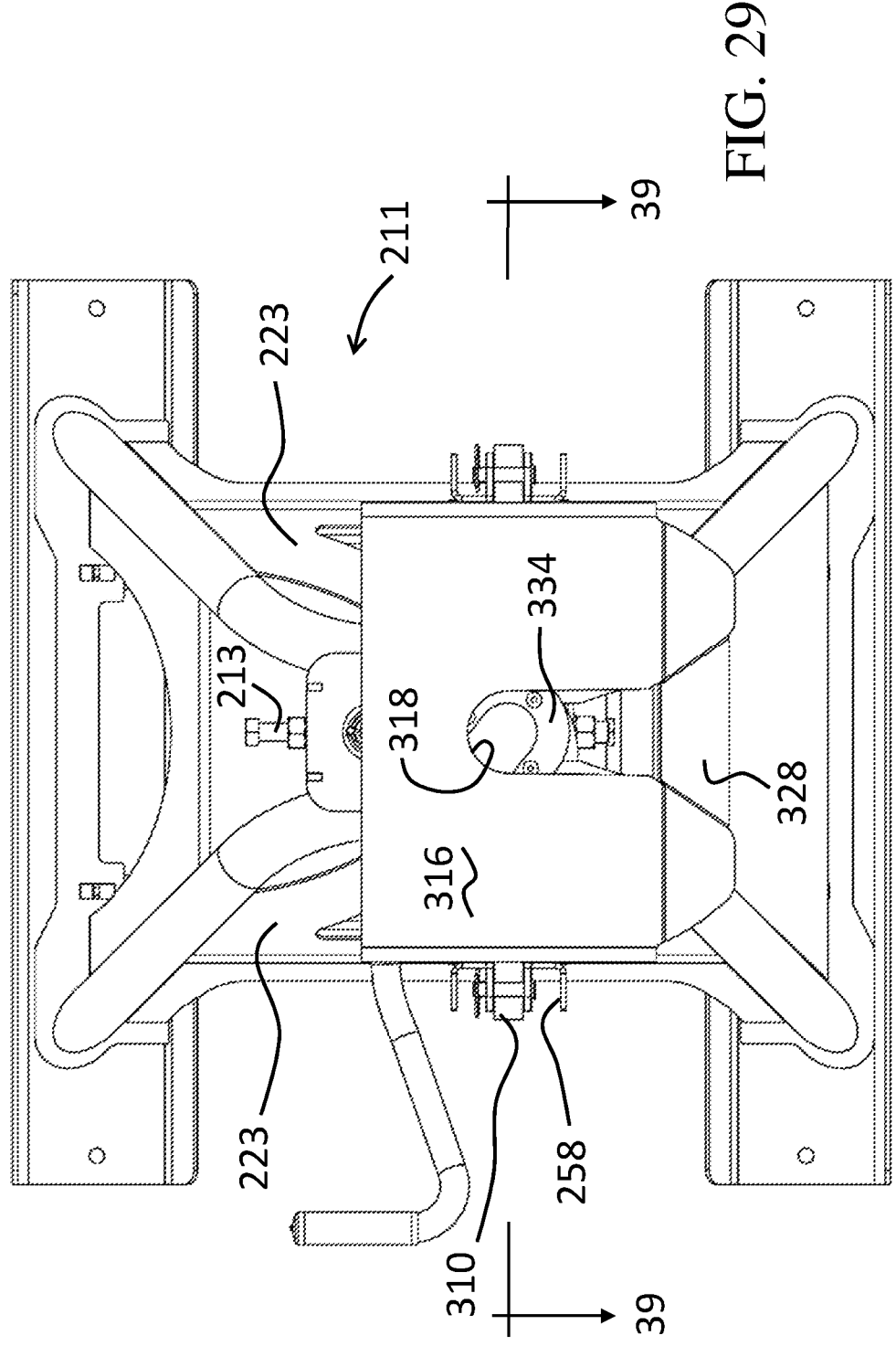
FIG. 29 is a top view of the hitch in FIG. 26.
Figure 30:
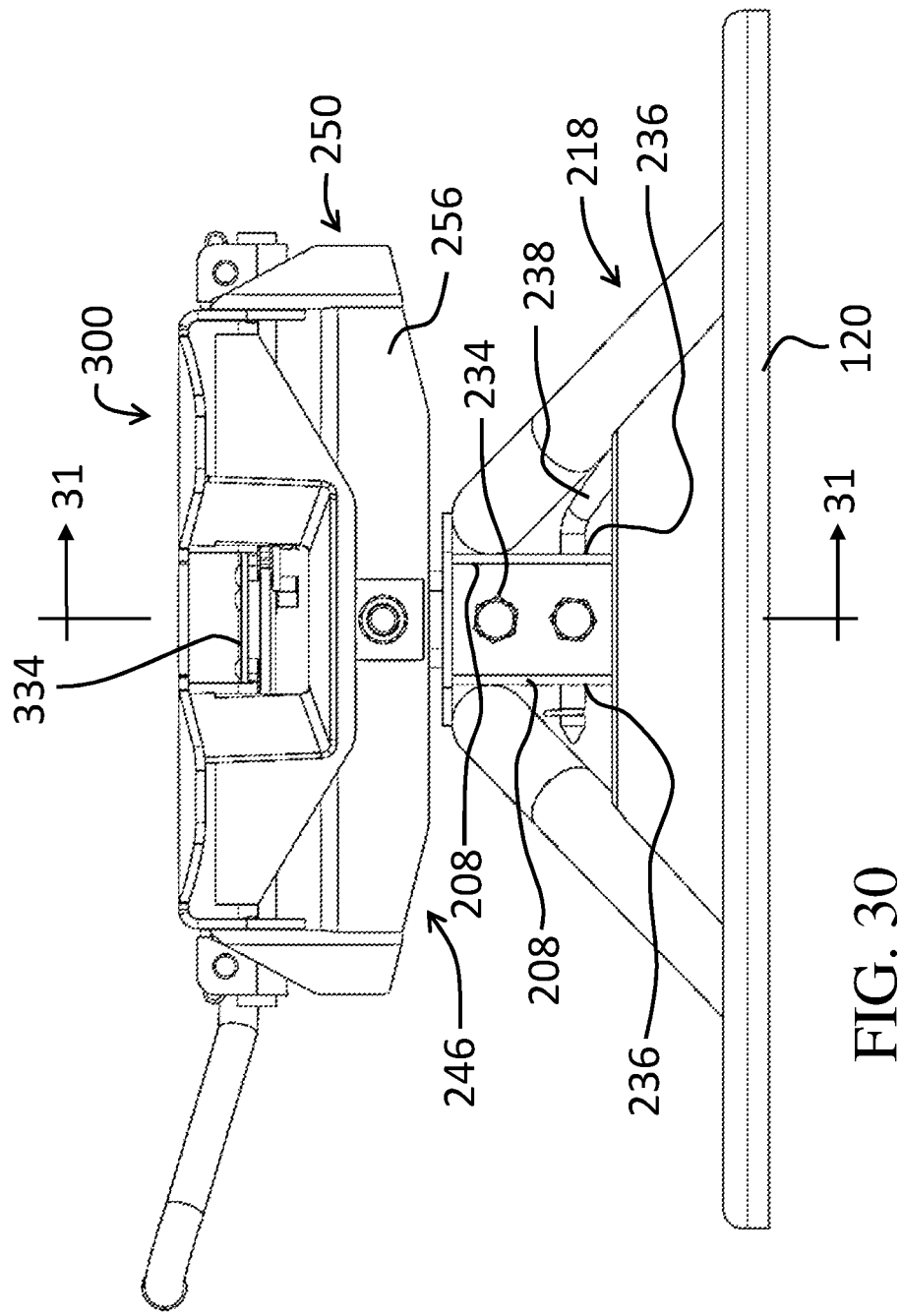
FIG. 30 is a front view of the hitch in FIG. 26.
Figure 37:
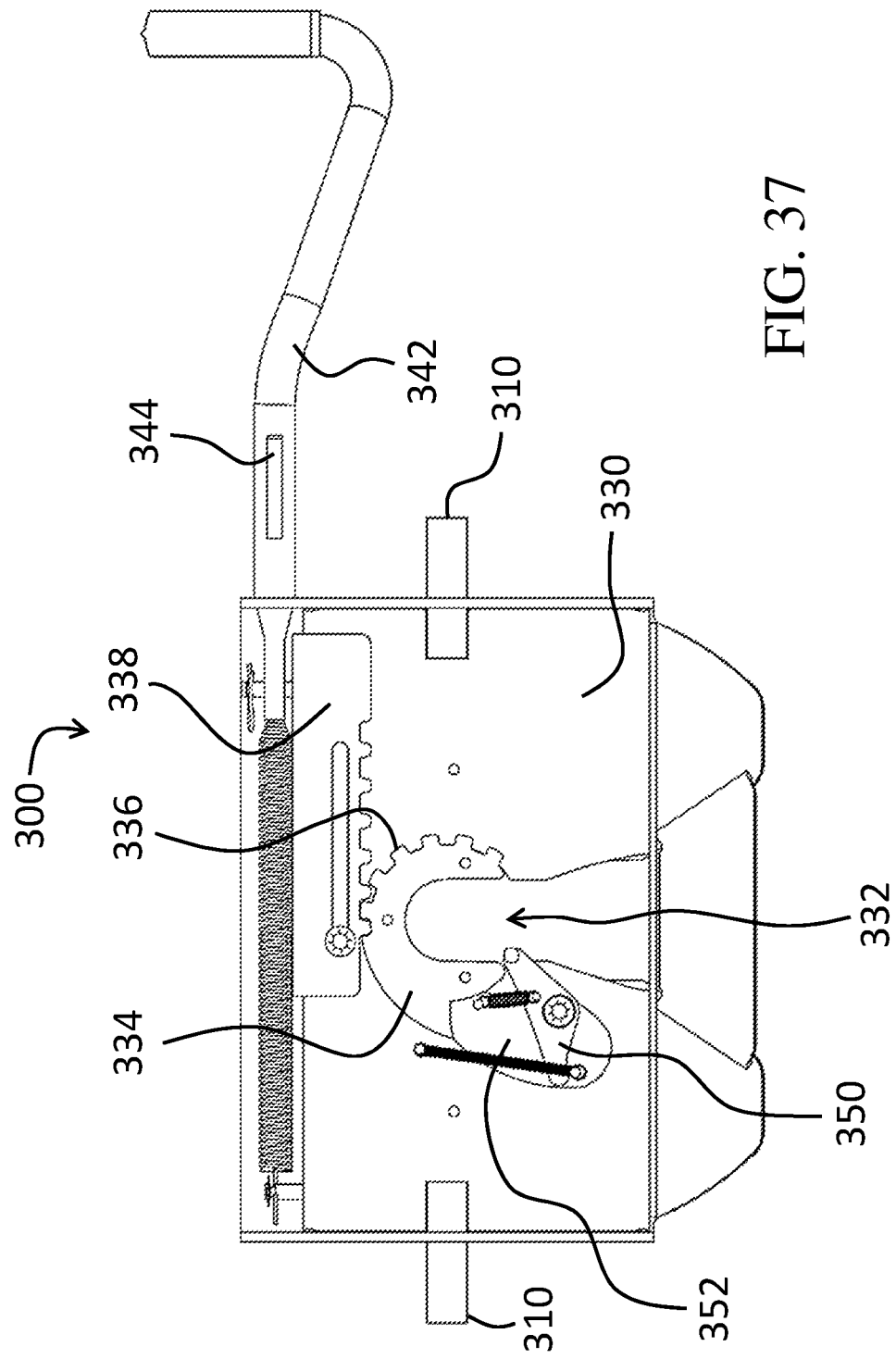
FIG. 37 is a bottom view of the plate assembly in the unlocked position.
Figure 38:
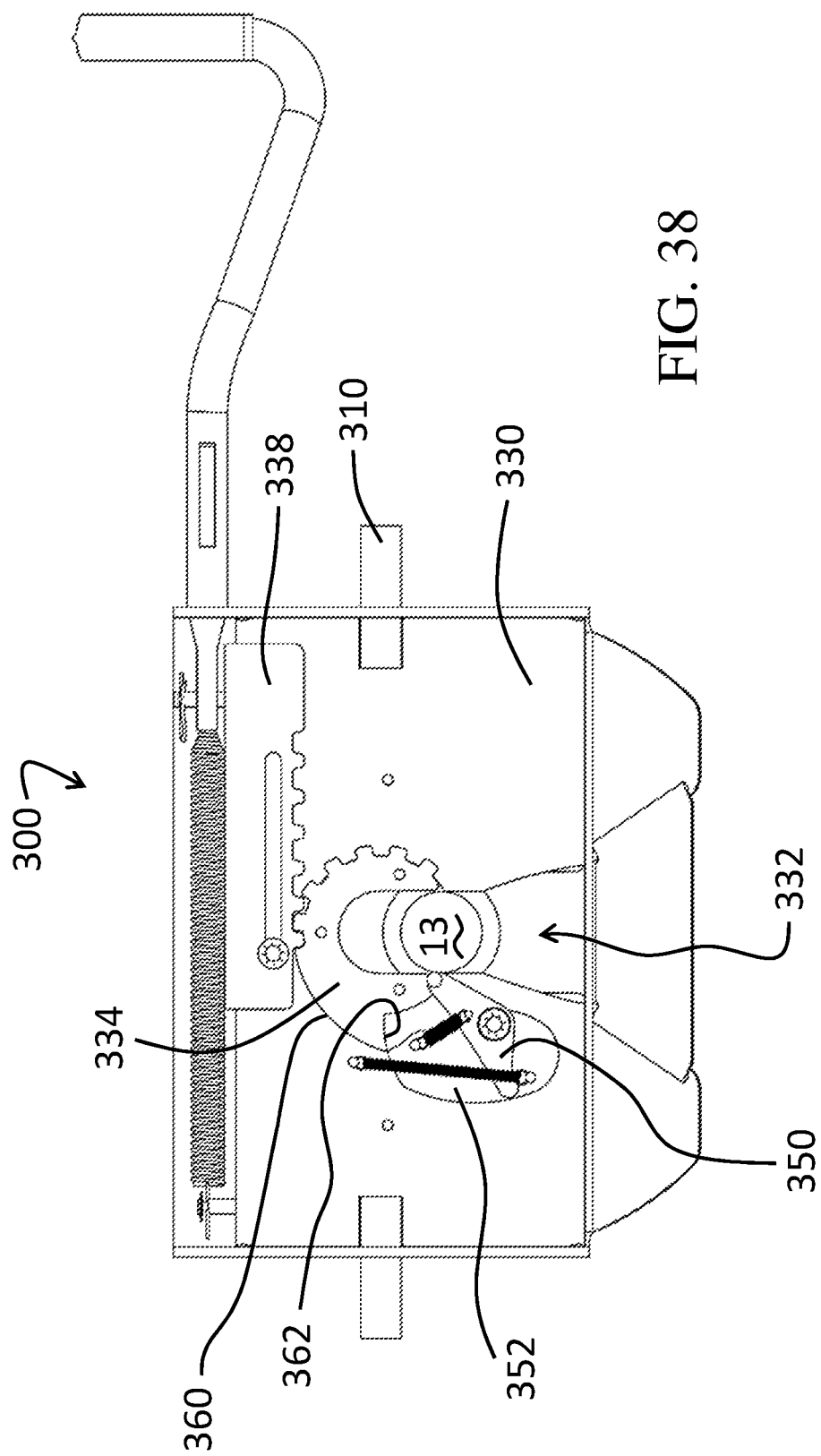
FIG. 38 is a bottom view of the plate assembly in FIG. 37 with the kingpin releasing the rotating lock.
Figure 39:
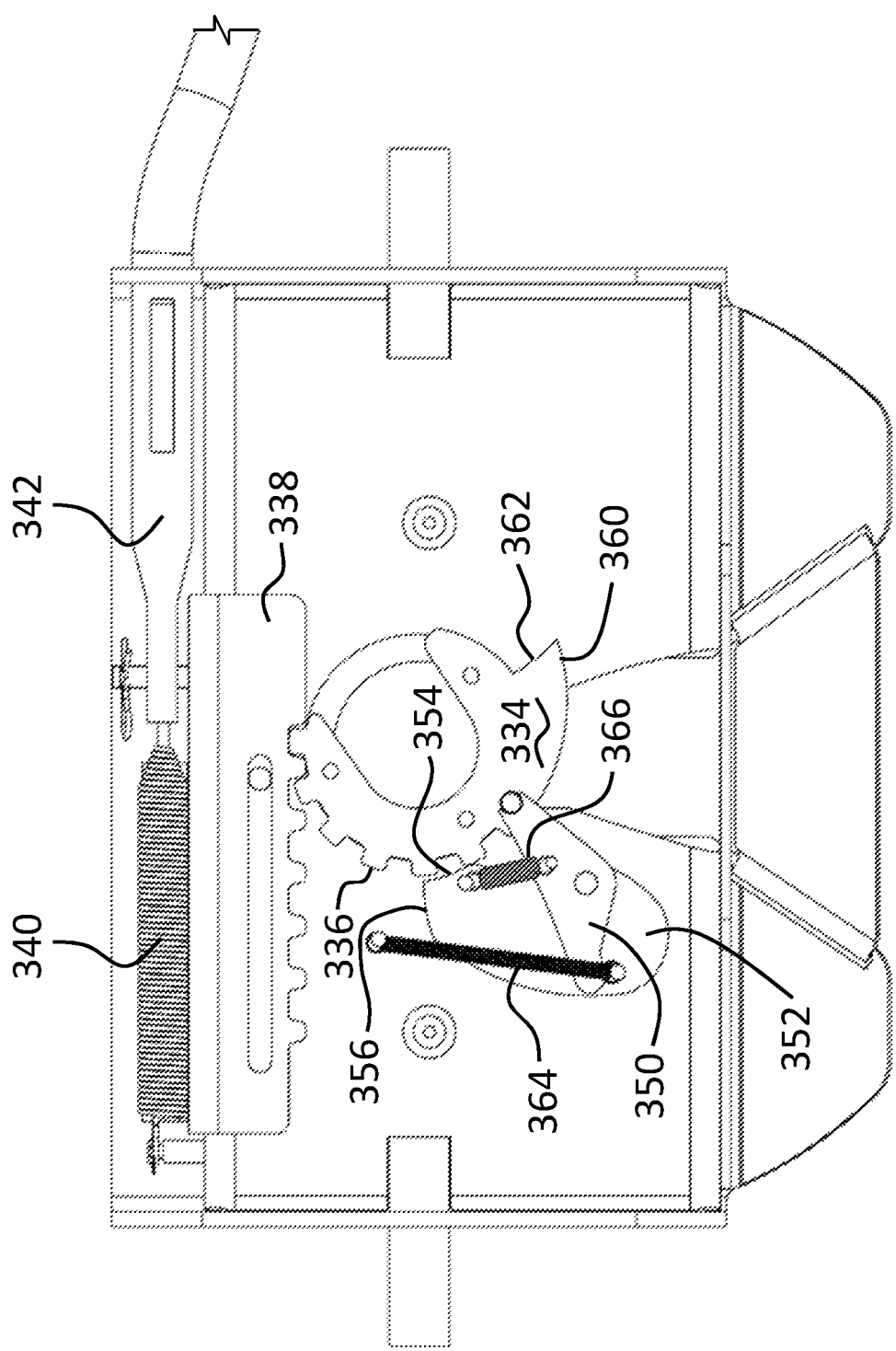
FIG. 39 is a partially exploded section view 39-39 of the hitch in FIG. 29.

A plate assembly 300 connects to the rocker assembly 246 with pins 310 that are located in pockets 253. The pins 310 are cylindrical and the plate assembly 300 can pivot about a pivot axis 312. The pins 310 are retained in the pockets 253 with pins 255. The pivot axis 312 passes through the kingpin socket 314, which is located at a midpoint between the pins 310. The plate assembly 300 is designed to releasably connect to a kingpin 13 that extends downwardly from a pin box 11 on a trailer. The plate assembly 300 includes a top plate 316 with a notch 318. The plate assembly includes a catcher gusset 326 and catcher 328 that assist in guiding the king pin as it enters the notch 318. The lower plate 330 has a notch 332 that is also aligned with notch 318, but includes a rotating lock 334. The rotating lock 334 is captured in the notch 332 and can rotate between a locked position (as shown in FIG. 29) and an unlocked position (as shown in FIG. 37). In the locked position, the lock 334 captures a kingpin that is located in the notch 332. In the unlocked position, a kingpin can enter and exit the notch 332. The rotating lock 334 has teeth 336 and mates with a rack 338. In the unlocked position, the kingpin can enter the notches 318 and 332. The rack 338 is biased towards the locked position with a spring 340 connected to a release handle 342 that slides between a corresponding locked and unlocked position. The rack 338 is constrained between the lower plate 330 and a retainer 324. The release handle 342 has a catch 344 that requires the handle 342 to be lifted upwardly to prevent the handle from stopping and contacting the bottom of the handle aperture 346 in the top plate 316 while it is being pulled. The rotating lock 334 mates with a release cam 350 and cam lock 352 that has a sliding surface 354 and a stop surface 356. The cam lock 352 engages with a ramp surface 360 and catch surface 362. Springs 364, 366 bias the cam 350 and cam lock 352 towards the notch 332. In the unlocked position, the stop surface 356 of the cam lock 352 is in biased contact with the catch surface 362. The release cam 350 protrudes slightly into the notch 332, such that when the kingpin 13 enters the notch as shown in FIG. 38, the release cam 350 contacts the kingpin and moves the cam lock 352 away from the catch surface 362, allowing the spring 340 to move the rack 338 and rotate the lock 334 to rotate to the locked position. To unlock the rotating lock 334, the user pulls on the release handle 342, which causes the gear teeth on the rack 338 that are mated to the teeth 336 on the rotating lock 334 to rotate it. The ramp surface 360 slides along the cam lock 352 with the springs 364, 366 to maintain contact. As soon as the catch surface 362 passes the edge of the cam lock 352, the cam lock 352 drops into place as shown in FIG. 37, holding the rotating lock 334 in the unlocked position. As the kingpin 13 exits, it contacts the release cam 350

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A single point hitch comprising:
   a ball cage having a bottom wall with a ball aperture for receiving a portion of a gooseneck ball, said ball cage having upstanding walls affixed between said bottom wall and a top wall, said upstanding walls having a transverse aperture to receive a pin to capture said portion of said gooseneck ball within said ball cage, said ball cage having a ball axis extending through said ball aperture;
   a frame having a lower wall and an upper wall, said frame having a sleeve portion fixed with respect to said frame and located between said upper wall and said lower wall, said sleeve portion having a transverse hole extending therethrough, said sleeve portion having a centrally located sleeve axis;
   said frame having a cage pocket affixed thereto adjacent said sleeve portion, said upper wall having an aperture to receive a threaded fastener, said cage pocket for receiving said ball cage in a first orientation defined by said ball axis being relatively close to said sleeve axis and a second orientation defined by said ball axis being relatively far from said sleeve axis, said threaded fastener for extending through said aperture in said upper wall in said first and said second orientation, said threaded fastener for drawing said ball cage into said cage pocket;
   a rocker assembly including a tube and a cradle, said cradle pivotally attached to said tube and pivotable about a cradle axis, said tube for being telescopingly received by said sleeve portion, said tube movable with respect to said sleeve portion along said sleeve axis, said tube having a transverse hole extending therethrough, said tube being selectively lockable with respect to said frame when said transverse hole of said sleeve portion is aligned with said transverse hole of said tube; and
   a plate assembly having pins affixed thereto for connecting said plate assembly to said rocker assembly, said plate pivotable with respect to said rocker assembly about said pins on a pivot axis, said plate assembly having a notch for receiving a kingpin, said notch having a rotating lock captured thereby and rotatable between a locked position and an unlocked position.

2. The single point hitch in claim 1, said plate assembly including a release cam and a cam lock, said rotating lock having a catch contacting said cam lock in said unlocked position, said release cam extending into said notch in said unlocked position.

3. The single point hitch in claim 2, said cam lock having a sliding surface and a stop surface, said release cam in biased contact with said stop surface in said unlocked position, said release cam contacting said kingpin to release said cam lock from said unlocked position, a spring connecting said release cam and said cam lock.

4. The single point hitch in claim 1, said rotating lock having teeth, said teeth mated with complimentary teeth on a rack, said rack connected to a spring biasing said rotating lock towards said locked position.

5. The single point hitch in claim 4, said rotating lock having a ramp surface and catch surface, a cam lock in biased contact with said catch surface when said rotating lock is in said unlocked position.

6. The single point hitch in claim 1, further comprising bed supports constrained by said frame.

7. A single point hitch comprising:
a ball cage having a ball aperture for receiving a portion of a gooseneck ball, said ball cage having a transverse aperture to receive a pin to capture said portion of said gooseneck ball within said ball cage on a ball axis;
a frame having a lower wall and an upper wall, said frame having a sleeve portion fixed with respect to said frame and located between said upper wall and said lower wall, said sleeve portion having a transverse hole extending therethrough, said sleeve portion having a centrally located sleeve axis;
said frame having a cage pocket affixed thereto adjacent said sleeve portion, said upper wall having an aperture to receive a threaded fastener, said cage pocket for receiving said ball cage in a first orientation defined by said ball axis being relatively close to said sleeve axis and a second orientation defined by said ball axis being relatively far from said sleeve axis, said threaded fastener for extending through said aperture in said upper wall in said first and said second orientation, said threaded fastener for drawing said ball cage into said cage pocket;
a rocker assembly for being telescopingly received by said sleeve portion, said rocker assembly movable with respect to said sleeve portion along said sleeve axis, said rocker assembly having a transverse hole extending therethrough, said rocker assembly being selectively lockable with respect to said frame when said transverse hole of said sleeve portion is aligned with said transverse hole of said rocker assembly; and
a plate assembly attached to said rocker assembly, said plate assembly pivotable with respect to said rocker assembly on a pivot axis, said plate assembly for receiving and attaching a kingpin in a notch, said notch having a rotating lock rotatable between a locked position and an unlocked position.

8. The single point hitch in claim 7, said plate assembly including a release cam and a cam lock, said rotating lock having a catch contacting said cam lock in said unlocked position, said release cam extending into said notch in said unlocked position.

9. The single point hitch in claim 7, said rotating lock having teeth, said teeth mated with complimentary teeth on a rack, said rack connected to a release handle and a spring biasing said rotating lock towards said locked position.

10. The single point hitch in claim 9, said rotating lock having a ramp surface and catch surface, a cam lock in biased contact with said catch surface when said rotating lock is in said unlocked position.

11. The single point hitch in claim 7, further comprising bed supports constrained by said frame.

12. The single point hitch in claim 7, said sleeve portion having threaded fasteners to impinge said rocker assembly.

13. The single point hitch in claim 7, wherein said threaded fastener has a lock aperture, said single point hitch further comprising a cage lock having nut locking aperture for receiving a nut engaging said threaded fastener, when said nut is received in said nut locking aperture, rotation of said nut is constrained with respect to said cage lock, said cage lock further comprising a tube having tube apertures, said tube apertures alignable with said lock aperture to receive a lock.

14. The single point hitch in claim 7, wherein said threaded fastener extends from a top wall of said ball cage and is aligned with said ball axis.

15. A single point hitch for being affixed to a towing vehicle having a bed surface and a gooseneck ball extending therefrom, said hitch comprising:
a frame for being affixed to said towing vehicle at a single point in a first orientation and a second orientation, said frame having foot portions, a cage pocket, and a sleeve portion having a sleeve axis, said cage pocket affixed to said frame adjacent and parallel to said sleeve portion, said first orientation defined by a ball aperture at a first distance from said sleeve portion, said second orientation defined by said ball aperture at a second distance from said sleeve portion, said second distance being greater than said first distance, a threaded fastener for drawing said frame into biased contact with said bed surface of said towing vehicle in said first or second orientation when said gooseneck ball is captured in said ball aperture;
said sleeve portion telescopingly receiving a rocker assembly, said rocker assembly extending therefrom in a direction away from said foot portions, said rocker assembly pivotably connected to a plate assembly for receiving a kingpin, and
bed supports receiving and overlaid by said foot portions, said bed supports for contacting said bed surface of said towing vehicle.

16. The single point hitch of claim 15, wherein said sleeve portion having a transverse hole extending therethrough, said sleeve portion having a centrally located sleeve axis extending therethrough, said rocker assembly being selectively lockable with respect to said sleeve portion.

17. The single point hitch of claim 15, wherein said bed supports include an upstanding member, said foot portions each include a slot, said upstanding members extending through said slots to constrain said foot portions with respect to said bed supports.

18. The single point hitch of claim 17 further comprising a low friction insert located between one of said foot portions and a corresponding said bed support.

19. The single point hitch of claim 15, wherein said sleeve portion includes a threaded aperture extending therethrough to receive a corresponding fastener, said fastener for impinging on said rocker assembly.

20. The single point hitch in claim 15, further comprising a gooseneck ball cage having said ball aperture for receiving said gooseneck ball, said ball cage having a transverse aperture to receive a pin to constrain a portion of said gooseneck ball within said ball cage, said ball cage having a ball axis centrally located within said ball aperture and extending perpendicularly through said ball aperture and said ball axis nearer a first end of said ball cage than a second end of said ball cage, said frame includes a cage pocket affixed thereto for receiving said ball cage in a complementary manner, said cage pocket to receive said ball cage in said first orientation defined by said ball axis being relatively close to said sleeve axis and said second orientation defined by said ball axis being relatively far from said sleeve axis, a threaded fastener to extend through a portion of said frame for drawing said ball cage into said cage pocket.

* * * * *